United States Patent
Morin et al.

(10) Patent No.: US 6,878,443 B2
(45) Date of Patent: Apr. 12, 2005

(54) POLYPROPYLENE MONOFILAMENT AND TAPE FIBERS EXHIBITING CERTAIN CREEP-STRAIN CHARACTERISTICS AND CORRESPONDING CRYSTALLINE CONFIGURATIONS

(75) Inventors: Brian G Morin, Greenville, SC (US); Joe Royer, Greenville, SC (US); Brian M Burkhart, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/899,510

(22) Filed: Jul. 26, 2004

(65) Prior Publication Data

US 2005/0019565 A1 Jan. 27, 2005

Related U.S. Application Data

(60) Division of application No. 10/443,003, filed on Sep. 15, 2003, which is a continuation-in-part of application No. 10/295,463, filed on Nov. 16, 2002, now Pat. No. 6,759,124.

(51) Int. Cl.$^7$ .................................................. D01F 6/00
(52) U.S. Cl. ...................................... 428/364; 428/395
(58) Field of Search ............................... 428/364, 394; 524/387

(56) References Cited

U.S. PATENT DOCUMENTS 4,016,118 A   4/1977   Hamada et al. ...... 260/17.4 SG (Continued)

FOREIGN PATENT DOCUMENTS

EP           0 611 271           10/1994

(Continued)

OTHER PUBLICATIONS

Patent abstracts of Japan; publication No. 11–0661554; date of publication of application Mar. 5, 1999; Highly heat–resistant polypropylene fiber; English translation.

(Continued)

*Primary Examiner*—N. Edwards
(74) *Attorney, Agent, or Firm*—Terry T. Moyer; John E. Vick, Jr.

(57) ABSTRACT

Unique thermoplastic (polypropylene, specifically) monofilament and/or tape fibers and yarns that exhibit heretofore unattained physical properties are provided. Such fibers are basically manufactured through the extrusion of thermoplastic resins that include a certain class of nucleating agent therein, and are able to be drawn at high ratios with such nucleating agents present, that the tenacity and modulus strength are much higher than other previously produced thermoplastic fibers (particularly those produced under commercial conditions), particularly those that also simultaneously exhibit extremely low shrinkage rates. Thus, such fibers require the presence of certain compounds that quickly and effectively provide rigidity to the target thermoplastic (for example, polypropylene), particularly after heat-setting. Generally, these compounds include any structure that nucleates polymer crystals within the target thermoplastic after exposure to sufficient heat to melt the initial pelletized polymer and allowing such an oriented polymer to cool. The compounds must nucleate polymer crystals at a higher temperature than the target thermoplastic without the nucleating agent during cooling. In such a manner, the "rigidifying" nucleator compounds provide nucleation sites for thermoplastic crystal growth. The preferred "rigidifying" compounds include dibenzylidene sorbitol based compounds, as well as less preferred compounds, such as [2.2.1]heptane-bicyclodicarboxylic acid, otherwise known as HPN-68, sodium benzoate, talc, certain sodium and lithium phosphate salts [such as sodium 2,2'-methylene-bis-(4,6-di-tert-butylphenyl)phosphate, otherwise known as NA-11]. Specific methods of manufacture of such inventive thermoplastic fibers, as well as fabric articles made therefrom, are also encompassed within this invention.

19 Claims, 7 Drawing Sheets

U.S. PATENT DOCUMENTS

| | | | |
|---|---|---|---|
| 4,116,626 A | 9/1978 | Varner | 4/149 |
| 4,132,817 A | 1/1979 | Tillotson | 427/244 |
| 4,171,395 A | 10/1979 | Tillotson | 428/95 |
| 4,463,113 A | 7/1984 | Nakahara et al. | 524/117 |
| 4,512,831 A | 4/1985 | Tillotson | 156/78 |
| 4,522,857 A | 6/1985 | Higgins | 428/95 |
| 4,560,734 A | 12/1985 | Fujishita et al. | 526/142 |
| 5,049,605 A | 9/1991 | Rekers | 524/108 |
| 5,136,520 A | 8/1992 | Cox | 364/470 |
| 5,208,592 A | 5/1993 | Johnson, Jr. | 341/63 |
| 5,231,126 A | 7/1993 | Shi et al. | 524/296 |
| 5,342,868 A | 8/1994 | Kimura et al. | 524/108 |
| 5,512,357 A | 4/1996 | Shimura et al. | 428/283 |
| 5,540,968 A | 7/1996 | Higgins | 428/95 |
| 5,545,276 A | 8/1996 | Higgins | 156/79 |
| 5,753,736 A | 5/1998 | Bhat et al. | 524/287 |
| 5,798,167 A | 8/1998 | Connor et al. | 428/171 |
| 5,811,045 A | 9/1998 | Pike | 264/168 |
| 5,912,292 A | 6/1999 | Sun | 524/301 |
| 5,945,215 A | 8/1999 | Bersted et al. | 428/364 |
| 5,948,500 A | 9/1999 | Higgins | 428/95 |
| 6,102,999 A | 8/2000 | Cobb, III et al. | 106/243 |
| 6,110,588 A | 8/2000 | Perez et al. | 428/287 |
| 6,127,440 A | 10/2000 | Sanyasi | 521/74 |
| 6,127,470 A | 10/2000 | Cobb, III et al. | 524/367 |
| 6,135,987 A | 10/2000 | Tsai et al. | 604/365 |
| 6,162,887 A | 12/2000 | Yamada et al. | 526/351 |
| 6,203,881 B1 | 3/2001 | Higgins | 428/95 |
| 6,207,600 B1 | 3/2001 | Nakajima et al. | 442/311 |
| 6,210,802 B1 | 4/2001 | Risch et al. | 428/398 |
| 6,218,011 B1 | 4/2001 | Raetzsch et al. | 428/394 |
| 6,231,976 B1 | 5/2001 | Dean et al. | 428/373 |
| 6,238,615 B1 | 5/2001 | Kobayashi et al. | 264/537 |
| 6,261,677 B1 | 7/2001 | Tsai et al. | 428/221 |
| 6,270,608 B1 | 8/2001 | Vair, Jr. et al. | 156/176 |
| 6,284,370 B1 | 9/2001 | Fujimoto et al. | 428/221 |
| 6,300,415 B1 | 10/2001 | Okayama et al. | 525/191 |
| 6,358,450 B1 | 3/2002 | Sun | 264/178 |
| 6,420,024 B1 | 7/2002 | Perez et al. | 428/359 |
| 6,468,623 B1 | 10/2002 | Higgins | 428/95 |
| 6,534,574 B1 | 3/2003 | Zhao et al. | 524/284 |
| 6,541,554 B2 * | 4/2003 | Morin et al. | 524/387 |
| 6,559,211 B2 | 5/2003 | Zhao et al. | 524/285 |
| 6,559,216 B1 | 5/2003 | Zhao et al. | 524/336 |
| 6,656,404 B2 | 12/2003 | Morin et al. | 264/210.5 |
| 6,794,033 B2 * | 9/2004 | Morin et al. | 428/394 |
| 2001/0040320 A1 | 11/2001 | Kobayashi et al. | 264/537 |
| 2001/0048179 A1 | 12/2001 | Stewart et al. | 264/211 |
| 2002/0002241 A1 | 1/2002 | Raetzsch et al. | 123/556 |

FOREIGN PATENT DOCUMENTS

| | | |
|---|---|---|
| EP | 0 806 237 | 7/1997 |
| JP | 11061554 A | 3/1999 |
| JP | 11140719 | 5/1999 |
| JP | P2002-302825 | 4/2001 |
| WO | 02/46502 | 6/2002 |

OTHER PUBLICATIONS

Patent abstracts of Japan; publication No. 11–181619; date of publication of application Jun. 6, 1999; Highly heat–resistant polypropylene fiber and fiber–reinforced cement molded product using the same; English translation.

Patent abstracts of Japan; publication No. 2001–081628; date of publication Mar. 27, 2001; Flat yarn for base cloth of needle–punched carpet; English translation.

Patent abstracts of Japan; publication No. 2002–302825; date of publication Oct. 18, 2002; Highly–resistant polypropylene fibers; English translation.

Article; Journal of applied polymer science, vol. 62, 1965–1975 (1996) John Wiley & Sons, Inc.; Spruiell et al.

Article; The effects of pigments on the development of structure and properties of polypropylene filaments; Antec '91; Lin et al.

Article; The role of crystallization kinetics in the development of the structure and properties of polypropylene filaments; © 1993 John Wiley & Sons, Inc.; CCC 0021–8995/93/040623–9.

Article; Study on the formation of b–crystalline from isotactic polypropylene fiber; fiber and films, Intern. Polymer Processing VI, 1991; Chen et al.

Article; Heterogeneous Nucleation of Polypropylene and Polypropylene Fibers; Marcincin et al.; 1994.

* cited by examiner

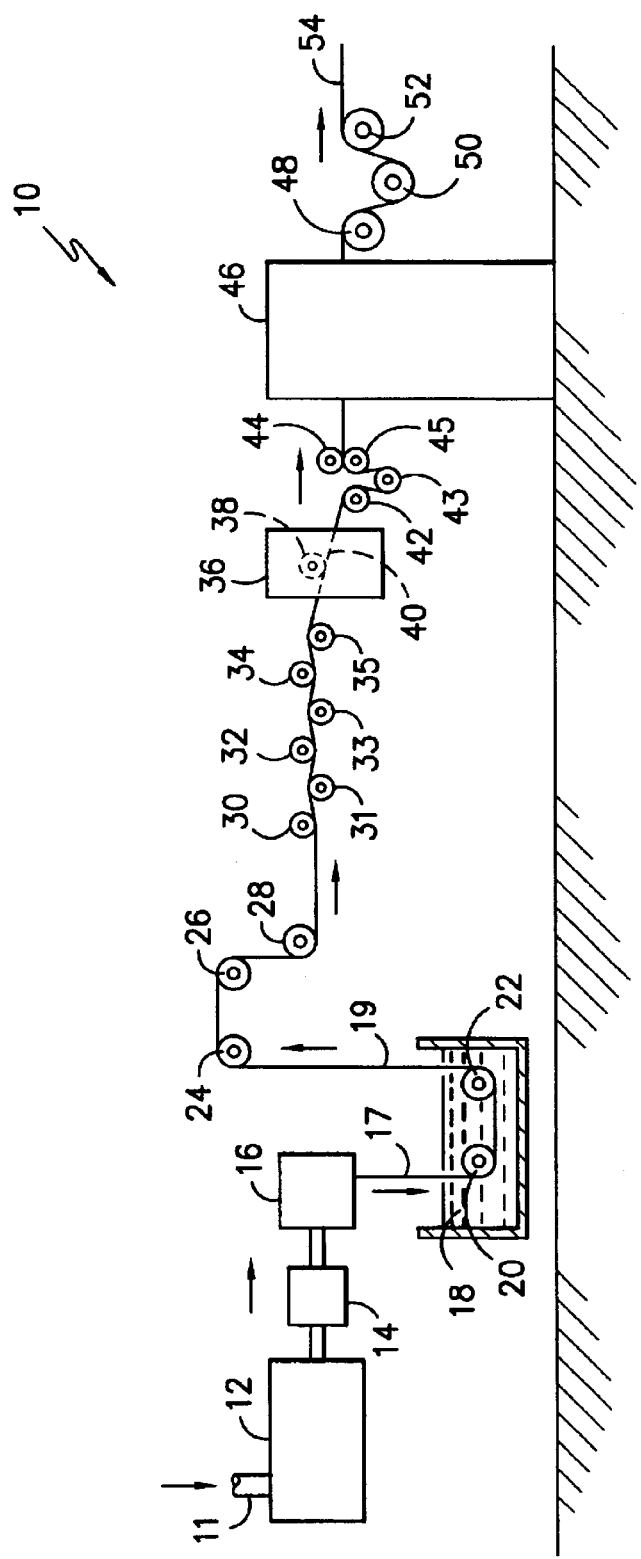
FIG. -1-

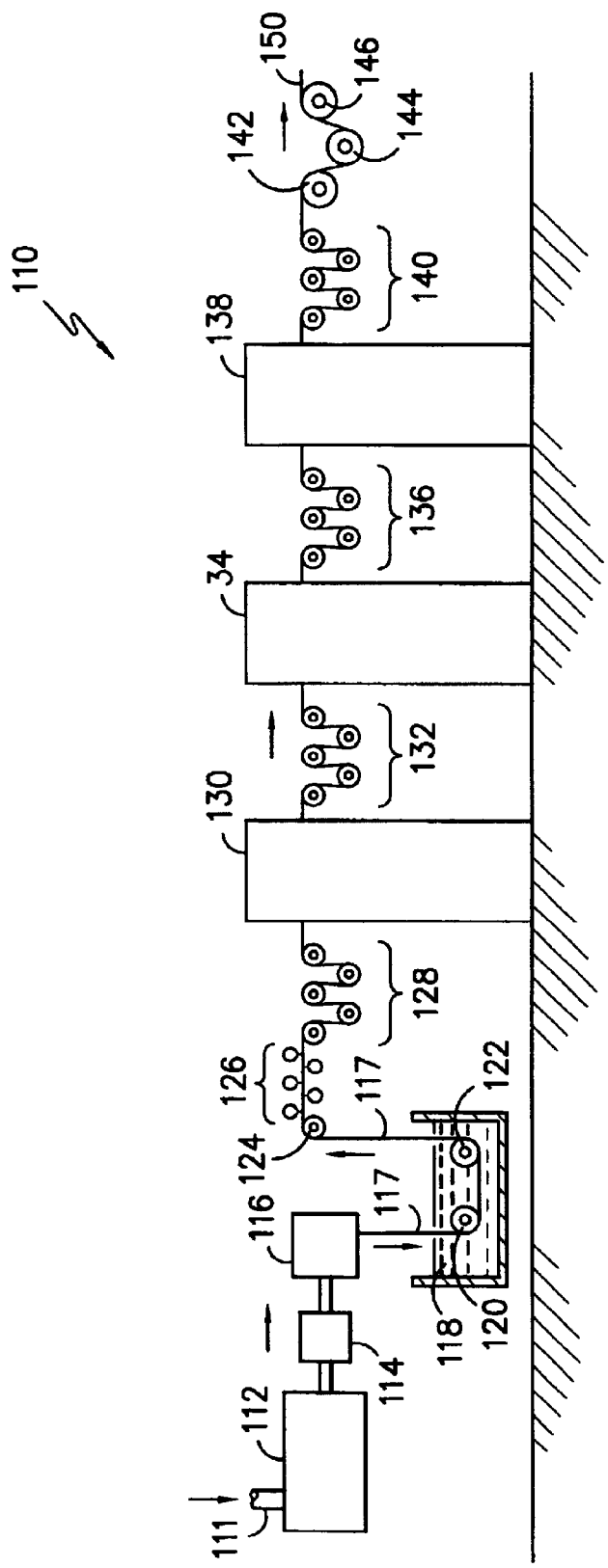
FIG. -2-

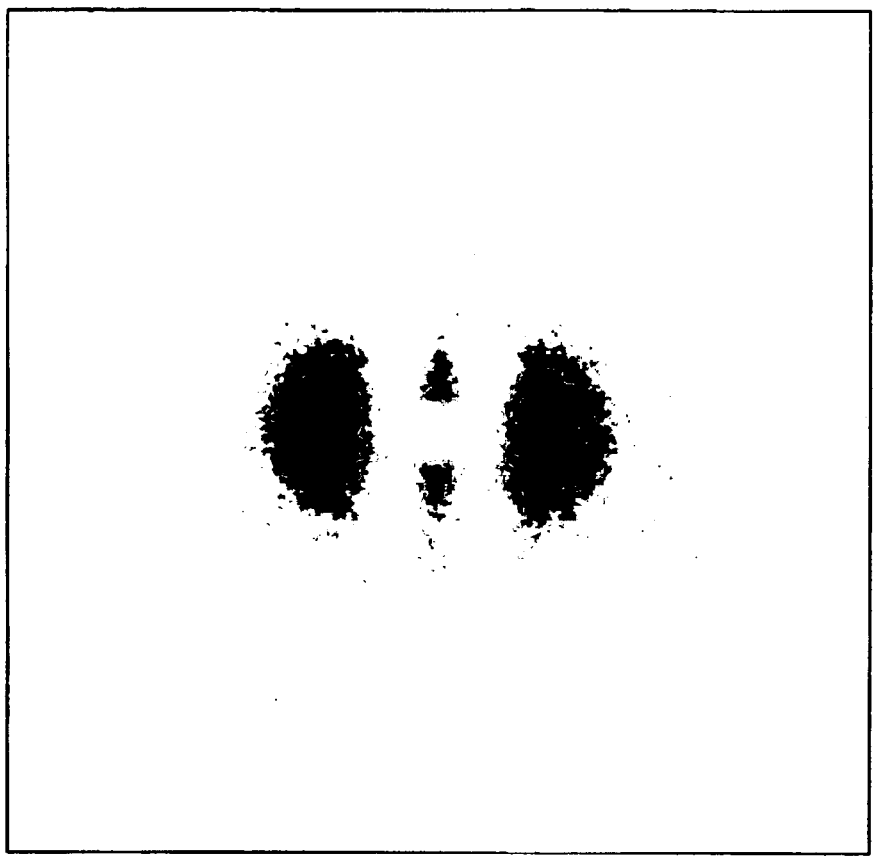
FIG. -3-

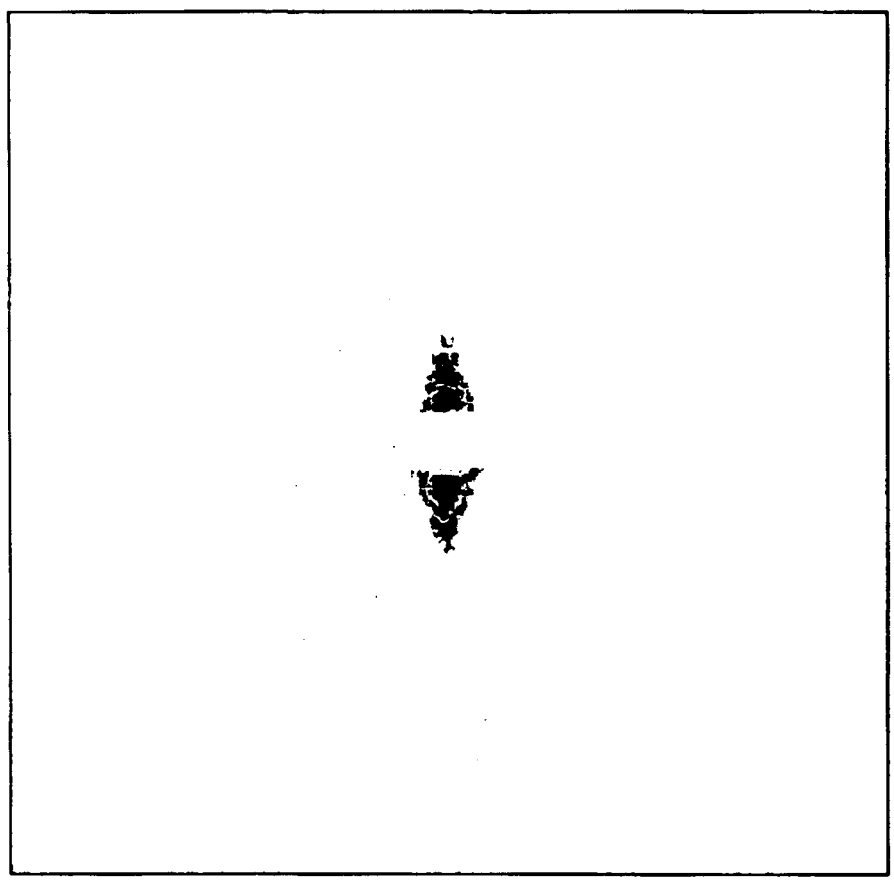
FIG. —4—

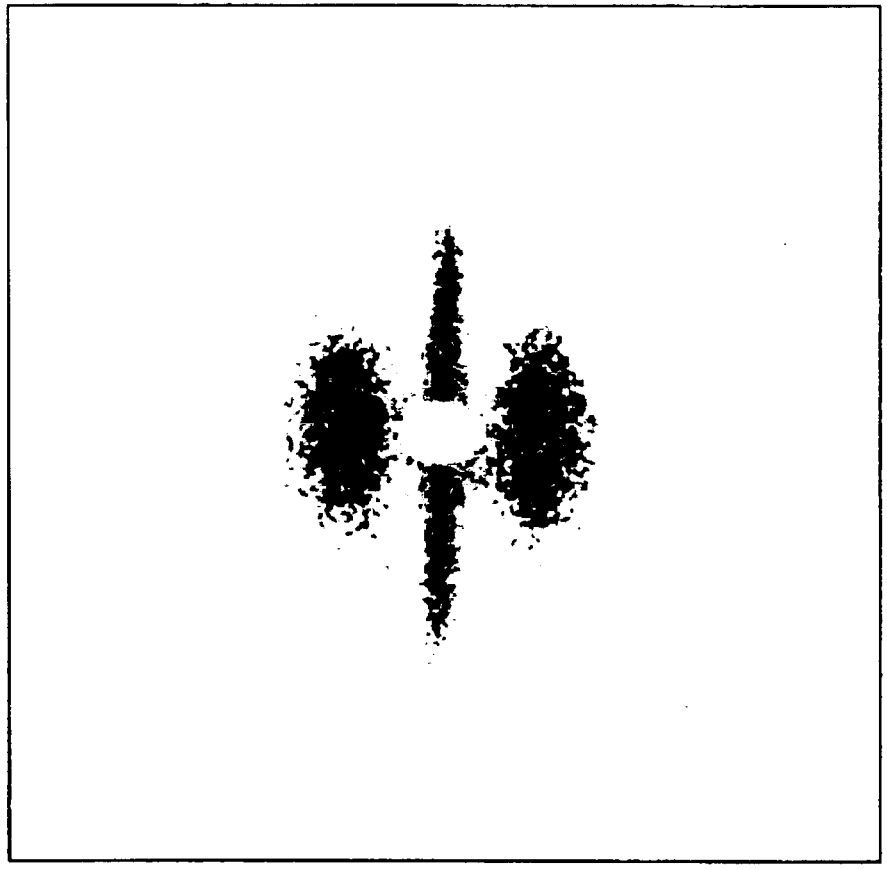
FIG. —5—

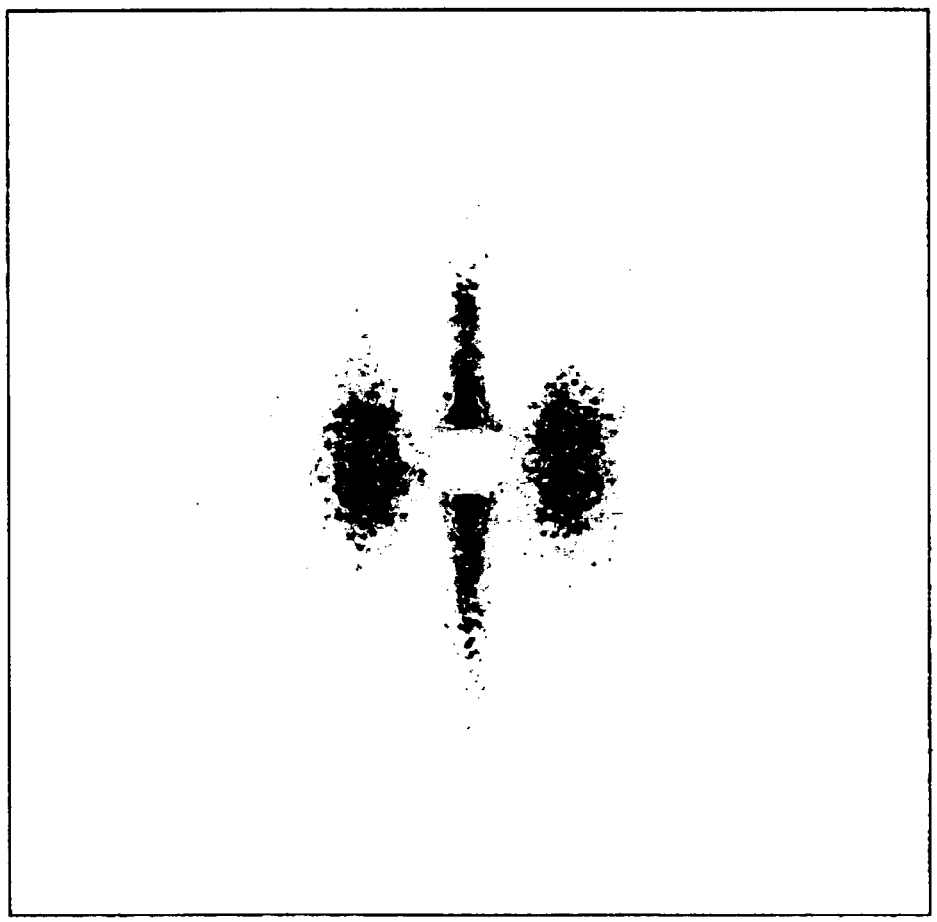
FIG. -6-

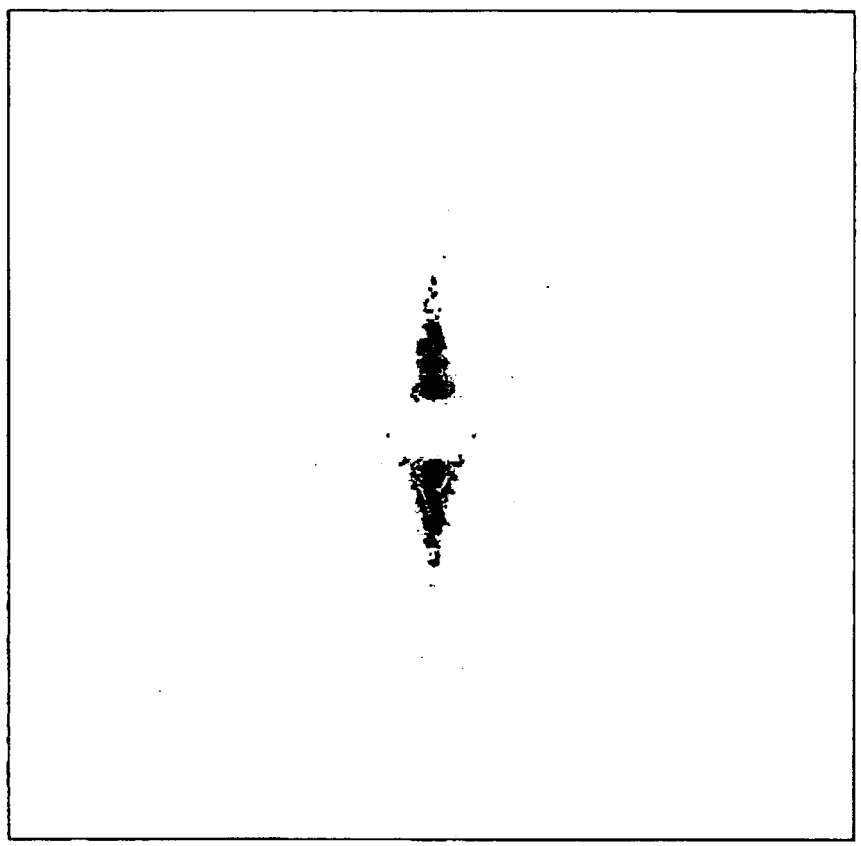
FIG. -7-

POLYPROPYLENE MONOFILAMENT AND TAPE FIBERS EXHIBITING CERTAIN CREEP-STRAIN CHARACTERISTICS AND CORRESPONDING CRYSTALLINE CONFIGURATIONS

CROSS REFERENCE TO RELATED APPLICATIONS

This application is a divisional of application Ser. No. 10/443,003, filed Sep. 15, 2003, which is a continuation-in-part of application Ser. No. 10/295,463, filed on Nov. 16, 2002 now U.S. Pat. No. 6,759,124.

FIELD OF THE INVENTION

This invention relates to unique thermoplastic (polypropylene, specifically) monofilament and/or tape fibers and yarns that exhibit heretofore unattained physical properties. Such fibers are basically manufactured through the extrusion of thermoplastic resins that include a certain class of nucleating agent therein, and are able to be drawn at high ratios with such nucleating agents present, that the tenacity and modulus strength are much higher than other previously produced thermoplastic fibers (particularly those produced under commercial conditions), particularly those that also simultaneously exhibit extremely low shrinkage rates. Thus, such fibers require the presence of certain compounds that quickly and effectively provide rigidity to the target thermoplastic (for example, polypropylene), particularly after heat-setting. Generally, these compounds include any stricture that nucleates polymer crystals within the target thermoplastic after exposure to sufficient heat to melt the initial pelletized polymer and allowing such an oriented polymer to cool. The compounds must nucleate polymer crystals at a higher temperature than the target thermoplastic without the nucleating agent during cooling. In such a manner, the "rigidifying" nucleator compounds provide nucleation sites for thermoplastic crystal growth. The preferred "rigidifying" compounds include dibenzylidene sorbitol based compounds, as well as less preferred compounds, such as [2.2.1]heptane-bicyclodicarboxylic acid, otherwise known as HPN-68, sodium benzoate, talc, certain sodium and lithium phosphate salts [such as sodium 2,2'-methylene-bis-(4,6-di-tert-butylphenyl)phosphate, otherwise known as NA-11]. Specific methods of manufacture of such inventive thermoplastic fibers, as well as fabric articles made therefrom, are also encompassed within this invention.

Background of the Prior Art

Thermoplastic fibers (most significantly, polypropylene fibers) are utilized in various end-uses, including carpet backings, scrim fabrics, and other fabrics for article reinforcement or dimensional stability purposes. Other thermoplastics, such as polyesters, polyamides, and the like, are mostly used in apparel fabrics, draperies, napery fabrics, and the like, as well. Unfortunately, prior applications utilizing standard thermoplastic fibers have suffered from relatively high shrinkage rates, due primarily to the fiber constituents. Heat, moisture, and other environmental factors all contribute to shrinkage possibilities of the fibers (and yarns made therefrom), thereby causing a residual effect of shrinkage within the article itself. Thus, although such polypropylene fibers are highly desired in such end-uses as carpet backings, unfortunately, shrinkage causes highly undesirable warping or rippling of the final carpet product. Or, alternatively, the production methods of forming carpets (such as, for example, carpet tiles) compensate for expected high shrinkage, thereby resulting in generation of waste materials, or, at least, the loss of relatively expensive amounts of finished carpet material due to expected shrinkage of the carpet itself, all the result of the shrinkage rates exhibited by the carpet backing fibers themselves. Furthermore, such previously manufactured and practiced fibers suffer from relatively low tensile strengths. For scrim fabrics (such as in roofing articles, asphalt reinforcements, and the like), such shrinkage rate problems are of great importance as well to impart the best overall reinforcement capabilities to the target article and permitting the reinforced article to remain flat. Utilization of much more expensive polyesters and polyamides as constituent fibers has constituted the only alternative methods to such problematic high shrinkage fibers in the past (for both carpet backings and scrim applications). Such replacement fibers, however, are not only more expensive than polypropylene fibers, but their tensile modulus levels are sometimes too low for certain desired end-use applications.

There has been a continued desire to utilize such polypropylene fibers in various different products (as alluded to above), ranging from apparel to carpet backings (as well as carpet pile fabrics) to reinforcement fabrics, and so on. Such polypropylene fibers exhibit a certain high level of high strength characteristics and do not easily degrade or erode when exposed to certain "destructive" chemicals. However, even with such impressive and beneficial properties and an abundance of polypropylene, which is relatively inexpensive to manufacture and readily available as a petroleum refinery byproduct, such fibers are not widely utilized in products that are exposed to relatively high temperatures during use, cleaning, and the like. This is due primarily to the aforementioned high and generally non-uniform heat- and moisture-shrink characteristics exhibited by typical polypropylene fibers. Such fibers are not heat stable and when exposed to standard temperatures (such as 150° C. and 130° C. temperatures), the shrinkage range from about 2% (in boiling water) to about 3–4% (for hot air exposure) to 5–6% (for higher temperature hot air). In addition, when polypropylene tapes and monofilaments are processed in order to give relatively high tenacity and tensile modulus, the shrinkage can be even more dramatically higher, up to 20% at 150° C. These extremely high and varied shrink rates thus render the utilization and processability of highly desirable polypropylene fibers very low, particularly for end-uses that require heat stability (such as carpet pile, carpet backings, molded pieces, and the like). Furthermore, in high strength (high tenacity, high modulus, etc.) applications, such polypropylene fibers generally lack the requisite high strength physical characteristics needed to withstand external forces to permit utilization within a cost-effective article.

Past uses of polypropylene fibers within carpet backings have resulted in the necessity of estimating nonuniform shrinkage rates for final products and thus to basically expect the loss of a certain amount of product during such manufacturing and/or further treatment. For example, after a tufted fiber component is first attached to its primary carpet backing component for dimensional stability during printing, if such a step is desired to impart patterns of color or overall uniform colors to the target tufted substrate. After printing, a drying step is required to set the colors in place and reduce potential bleeding therefrom. The temperatures required for such a printing step (e.g., 130° C. and above) are generated within a heated area, generally, attached to the printing assembly. At such high temperatures, typical polypropylene tape fiber-containing backings exhibit the aforementioned high shrink rates (e.g., between 2–4% on average). Such shrinkage unfortunately dominates the dimensional configuration of the printed tufted substrate as well and thus dictates the ultimate dimensions of the overall product prior to attachment of a secondary backing. Such a secondary backing is thus typically cut to a size in relation to the expected size of the tufted component/primary backing article. Nonuniformity in shrinkage, as well as the need to provide differently sized secondary backings to the primary and tufted components thus evince the need for low-shrink polypropylene tape fiber primary carpet backings. With essentially zero shrinkage capability, the reliable selection of a uniform, proper size for the secondary backing would be a clear aid in reducing waste and cost in the manufacture of such carpets.

If printing is not desired, there still exist potential problems in relation to high-shrink tape fiber primary backing fabrics, namely the instance whereupon a latex adhesive is required to attach the remaining secondary backing components (as well as other components) to the tufted substrate/primary backing article. Drying is still a requirement to effectuate quick setting of such an adhesive. Upon exposure to sufficiently high temperatures, the sandwiched polypropylene tape fiber-containing primary backing will undergo a certain level of shrinkage, thereby potentially causing buckling of the ultimate product (or other problems associated with differing sizes of component parts within such a carpet article). And, again, tensile strength, tenacity, and modulus are generally unavailable at sufficiently high levels with simultaneous low-shrink properties. Thus, past low-shrink fibers have been highly suspect as proper selections for high-strength end-use fabrics.

To date, there has been no simple solution to such problems, even a fiber that provides merely the same tensile strength exhibited by such higher-shrink fibers. Some ideas for improving upon the shrink rate characteristics of polypropylene fibers have included narrowing and controlling the molecular weight distribution of the polypropylene components themselves in each fiber or mechanically working the target fibers prior to and during heat-setting. Unfortunately, molecular weight control is extremely difficult to accomplish initially, and has only provided the above-listed shrink rates (which are still too high for widespread utilization within the fabric industry. Furthermore, the utilization of very high heat-setting temperatures during mechanical treatment has, in most instances, resulted in the loss of good hand and feel to the subject fibers, and also tends to reduce the stiffness. Another solution to this problem is preshrinking the fibers, which involves winding the fiber on a crushable paper package, allowing the fiber to sit in the oven and shrink for long times, (crushing the paper package), and then rewinding on a package acceptable for further processing. This process, while yielding an acceptable yarn, is expensive, making the resulting fiber uncompetitive as compared to polyester and nylon fibers. As a result, there has not been any teaching or disclosure within the pertinent prior art providing any heat- and/or moisture-shrink improvements in polypropylene fiber technology.

As noted above, the main concern with this invention is the production of low-shrink, high-tenacity, high tensile strength, high modulus strength thermoplastic fibers. For the purpose of this invention, the term "thermoplastic fiber" or fibers is intended to encompass polyester, polyamide, or polyolefin monofilament fibers. As noted above, such a fiber is generally produced through the initial creation of a thermoplastic resin (such as a polypropylene, a polyolefin) from which the desired fibers are extruded into individual fibers that can then be incorporated into yarns, fabrics, or both. To date, no thermoplastic fibers exhibiting simultaneous low-shrink and high-modulus strength (high-tenacity) characteristics have been accorded the pertinent markets.

Additionally, it has been noted that prior polypropylene fibers, particularly tape and/or monofilament types, fail to provide sufficient degrees of creep-strain for certain end use availability. Fibers that do permit utilization within applications such as geotextiles, and the like, require reliable creep-strain characteristics for proper functioning. Polypropylene fibers performing at a level high enough for long-term reliability have not been forthcoming within this industry. Furthermore, fibers that exhibit proper crystal configurations (such as measured and analyzed by small angle X-ray scattering) to provide improved resistance to stretching, deforming, and other potentially destructive physical result during standard use have not been disclosed within the prior art.

DESCRIPTION OF THE INVENTION

It is thus an object of the invention to provide improved shrink rates while also increasing tensile strengths for thermoplastic fibers. A further object of the invention is to provide a class of additives that, in a range of concentrations, will provide low shrinkage and/or higher tensile strength levels for such inventive fibers (and yarns made therefrom). Another object of the invention is to provide a specific method for the production of nucleator-containing polypropylene fibers permitting the ultimate production of such low-shrink, high tensile strength, fabrics therewith.

Accordingly, this invention encompasses a monofilament thermoplastic fiber comprising at least one nucleator compound, wherein said fiber exhibits a shrinkage rate of at most 5% at 150° C. and a 3% secant modulus of at least 35 gf/denier, and optionally a tenacity measurement of at least 2.75 gf/denier. Also encompassed within this invention is a polypropylene monofilament fiber meeting these specific physical characteristic requirements. Such fibers can have any cross section; two common cross sections will be a round cross section, or a highly elongated rectangular cross section such as that produced when making slit film monofilaments (tape). Certain yarns and fabric articles comprising such inventive fibers are also encompassed within this invention.

Furthermore, this invention also concerns a method of producing such fibers comprising the sequential steps of a) extruding a heated formulation of thermoplastic resin comprising at least one nucleator compound into a fiber; b) immediately quenching the fiber of step "a" to a temperature which prevents orientation of thermoplastic crystals therein; c) mechanically drawing said individual fibers at a draw ratio of at least 5:1 while exposing said fibers to a temperature of at between 250 and 450° F., preferably between 300 and 420° F., and most preferably between 340 and 400° F., thereby permitting crystal orientation of the polypropylene therein; and d.) an optional heat setting step. Preferably, step "b" will be performed at a temperature of at most 95° C. and at least about 5° C., preferably between 5 and 60° C., and most preferably between 10 and 40° C. (or as close to room temperature as possible for a liquid through simply allowing the bath to acclimate itself to an environment at a temperature of about 25–30° C.). The quench is facilitated by using a liquid with a high heat capacity such as water. Again, such a temperature is needed to ensure that the component polymer (being polyolefin, such as polypropylene or polyethylene, polyester, such as polyethylene terephthalate, or polyamide, such as nylon 6, and the like, as structural enhancement additives therein that do not appreciably affect the shrinkage characteristics thereof) does not exhibit orientation of crystals. Upon the heated draw step, such orientation is effectuated which has now been determined to provide the necessary rigidification of the target fibers and thus to increase the strength and modulus of such fibers. Generally, high draw ratios facilitate breakage of the fibers during manufacture, therefore, leading to greater costs and much longer manufacturing times (if possible). However, with such high draw ratios, greater tensile strength, and modulus strengths are available as well. As a product of this invention, the addition of at least one nucleator compound to the thermoplastic resin which is submitted to high draw ratio, allows for the production of an ultra high modulus monofilament fiber with significantly less shrinkage than a fiber generated under similar conditions without the nucleator compound. Thus, as a continuous process, this inventive method provides surprisingly good results in physical characteristics by permitting high draw ratios to be utilized without breakage of the fibers during production. Hence, to effectuate such desirable physical characteristics, the drawing speed to line speed ratio should exceed at least 5, preferably at least 10, and most preferably, at least 12, times that of the rate of movement of the fiber through the production line after extrusion. Preferably, such a drawing speed is at from 400–2000 feet/minute, while the prior speed of the fibers from about 25–400 feet/minute, with the drawing speed ratio between the two areas being from about 5:1 to about 18:1, and is discussed in greater detail below, as is the preferred method itself. The optional step "d" final heat-setting temperature "locks" the polypropylene crystalline structure in place after extruding and drawing. Such a heat-setting step generally lasts for a portion of a second, up to potentially a couple of minutes (i.e., from about $1/10^{th}$ of a second, preferably about ½ of a second, up to about 3 minutes, preferably greater than ½ of a second). The heat-setting temperature should be in excess of the drawing temperature and must be at least 265° F., more preferably at least about 300° F., and most preferably at least about 350° F. (and as high as 450° F.).

Additionally, this invention encompasses a monofilament polypropylene yarn that exhibits a heated tension shrinkage level of at most 6% and a time to reach 10% elongation under 50% load of breaking strength (a "creep-strain test") of at least 4 hours. Alternatively, this invention encompasses the same type of yarn that is nucleated and exhibits a time to reach 10% elongation under the creep-strain test of at least 4 hours. Also, this invention encompasses a nucleated tape polypropylene fiber (having an aspect ratio of roughly 2:1) that exhibits a time to reach 10% elongation under a creep-strain test of at least 4 hours. Also, this invention encompasses a nucleated, mechanically drawn polypropylene tape fiber and/or monofilament yarn that exhibits recognizable scattering intensities in both the equatorial and meridonal axes when analyzed by small angle X-ray scattering such that the ratio of meridonal over equatorial axis intensities is at most 5.

A tape fiber is generally a fiber that is basically manufactured through the initial production of polypropylene films or tubes which are then slit into very thin, though flat (and having very high cross sectional aspect ratios). For the purpose of this invention, the term "tape fiber" or fibers is intended to encompass a monofilament fiber exhibiting a cross sectional aspect ratio of at least 2:1, and therefore is a relatively wide and flat fiber. As noted above, such a tape fiber is generally produced through the initial creation of a film and/or tube of polypropylene from which the desired fibers are then slit (thereby according the desired flat configuration through such a slitting procedure with the slitting means, such as blades, situated at substantially uniform distances from each other during the actual slitting process to provide substantially uniform aspect ratios for the target fibers themselves).

The term "mechanically drawing" or "mechanically drawn", or the like, is intended to encompass any number of procedures that basically involve placing an extensional force on fibers in order to elongate the polymer therein. Such a procedure may be accomplished with any number of apparatus, including, without limitation, godet rolls, nip rolls, steam cans, hot or cold gaseous jets (air or steam), and other like mechanical means.

Such yarns may also be produced through extruding individual fibers of high thickness and of a sufficient gauge, thereby followed by drawing and heatsetting steps in order to attain such low shrinkage rate properties. All shrinkage values discussed as they pertain to the inventive fibers and methods of making thereof correspond to exposure times for each test (hot air and boiling water) of about 5 minutes. The heat-shrinkage at about 150° C. in hot air is, as noted above, at most 5.0% for the inventive fiber; preferably, this heat-shrinkage is at most 2.5%; more preferably at most 2.0%; and most preferably at most 1.0%. Also, the amount of nucleating agent present within the inventive monofilament fiber is from about 50 to about 5,000 ppm; preferably this amount is at least 500 ppm; and most preferably is at least 1500 ppm, tip to a preferred maximum (for tensile strength retention) of about 5000 ppm, more preferably up to 4000 ppm, and most preferably as high as 3000 ppm. Any amount within this range should suffice to provide the high draw ratios, and the desired shrinkage rates after heat-setting of the fiber itself.

Alternatively, a shrinkage test, as described in greater depth below, has been followed for the inventive fibers and yarns wherein the test samples are exposed to a constant temperature in an oven of 117° C. under tension (hereinafter referred to as "the heated tension shrinkage test" and results are "the heated tension shrinkage level").

The term "polypropylene" is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as syndiotactic, isotactic, and the like). Thus, the term as applied to fibers is intended to encompass actual long strands, tapes, threads, and the like, of drawn polymer. The polypropylene may be of any standard melt flow (by testing); however, standard fiber grade polypropylene resins possess ranges of Melt Flow Indices between about 2 and 50. Contrary to standard plaques, containers, sheets, and the like (such as taught within U.S. Pat. No. 4,016,118 to Hamada et al., for example), fibers clearly differ in structure since they must exhibit a length that far exceeds its cross-sectional area (such, for example, its diameter for round fibers). Fibers are extruded and drawn; articles are blow-molded or injection molded, to name two alternative production methods. Also, the crystalline morphology of polypropylene within fibers is different than that of standard articles, plaques, sheets, and the like. For instance, the dpf of such polypropylene fibers is at most about 5000; whereas the dpf of these other articles is much greater. Polypropylene articles generally exhibit spherulitic crystals while fibers exhibit elongated, extended crystal structures (i.e., shish-kabobs). Thus, there is a great difference in structure between fibers and polypropylene articles such that any predictions made for spherulitic particles (crystals) of nucleated polypropylene do not provide any basis for determining the effectiveness of such nucleators as additives within polypropylene fibers. For this invention, the denier is preferably between 50 and 5000 dpf.

The advantage of such fibers is that a high tenacity/high modulus yarn and/or fiber provides the same function as standard yarns and/or fibers of the same resin and denier type, but at much lower weight. As a result, fabrics needing resilient structures, such as bags, supersacks, geotextiles, agricultural fabrics, carpet backings, road reinforcement fabrics, erosion (silt) retention fabrics, roofing fabrics, and the like, are available utilizing less expensive polypropylene fibers and/or yarns, whereas previously such polypropylene materials did not exhibit the proper physical characteristics for such applications. Lower creep-strain levels are the most noticeable improvements over previously produced fibers and yarns for such applications. Such lower creep levels permit retention of yarn and/or fiber shape. Generally, polypropylene fibers exhibit glass transition temperatures (Tg) lower than room temperature, and thus such fibers easily deform under tension. The inventive fibers and/or yarns do not necessarily overcome such Tg issues; however, they do exhibit a propensity to not deform readily under tension, particularly to the same level as provided by the more expensive polyamides and polyesters utilized primarily in such applications today. Basically, it has now been realized, surprisingly, that the inventive crystal structure of such inventive polypropylene yarns and/or fibers prevents deformity under standard use conditions.

The terms "nucleators", "nucleator compound(s)", "nucleating agent", and "nucleating agents" are intended to generally encompass, singularly or in combination, any additive to polypropylene that produces nucleation sites for polypropylene crystals from transition from its molten state to a solid, cooled structure. Hence, since the polypropylene composition (including nucleator compounds) must be molten to eventually extrude the fiber itself, the nucleator compound will provide such nucleation sites upon cooling of the polypropylene from its molten state. The only way in which such compounds provide the necessary nucleation sites is if such sites form prior to polypropylene recrystallization itself. Thus, any compound that exhibits such a beneficial effect and property is included within this definition. Such nucleator compounds more specifically include, as preferred compounds, most preferred, high-end nucleator types, including dibenzylidene sorbitol types, including, without limitation, dibenzylidene sorbitol (DBS), monomethyldibenzylidene sorbitol, such as 1,3:2,4-bis(p-methylbenzylidene) sorbitol (p-MDBS), dimethyl dibenzylidene sorbitol, such as 1,3:2,4-bis(3,4-dimethylbenzylidene) sorbitol (3,4-DMDBS), and HPN-68; as well as mid-range, less preferred, but acceptable nucleators, such as NA-11, NA-21, salts of hexhydrophthalate, and the like. Low-level nucleators that may also be utilized include sodium benzoate (and like salts), talc, nucleating pigments, and the like. The concentration of such nucleating agents (in total) within the target polypropylene fiber is at least 200 ppm up to 5000 ppm, preferably at least 1500 ppm to 4000 ppm, and most preferably from 2000 to 3000 ppm.

Also, without being limited by any specific scientific theory, it appears that the shrink-reducing nucleators that perform the best are those which exhibit relatively high solubility within the propylene itself. Thus, compounds which are readily soluble, such as 1,3:2,4-bis(p-methylbenzylidene) sorbitol provides the lowest shrinkage rate for the desired polypropylene fibers. The DBS derivative compounds are considered the best shrink-reducing nucleators within this invention due to the low crystalline sizes produced by such compounds. Other nucleators, such as NA-11 and HPN-68 (disodium [2.2.1]heptane bicyclodicarboxylate), also provide acceptable low-shrink characteristics to the target polypropylene fiber and thus are considered as potential nucleator compound additives within this invention. Basically, the selection criteria required of such nucleator compounds are particle sizes (the lower the better for ease in handling, mixing, and incorporation with the target resin), particle dispersability within the target resin (to provide the most effective nucleation properties), and nucleating temperature (e.g., crystallization temperature, determined for resin samples through differential scanning calorimetry analysis of molten nucleated resins), the higher such a temperature, the better.

It has been determined that the nucleator compounds that exhibit good solubility in the target molten polypropylene resins (and thus are liquid in nature during that stage in the fiber-production process) provide effective low-shrink characteristics. Thus, low substituted DBS compounds (including DBS, p-MDBS, DMDBS) appear to provide fewer manufacturing issues as well as lower shrink properties within the finished polypropylene fibers themselves. Although p-MDBS and DMDBS are preferred, however, any of the above-mentioned nucleators may be utilized within this invention as long as the x-ray scattering measurements are met or the low shrink requirements are achieved through utilization of such compounds. Mixtures of such nucleators may also be used during processing in order to provide such low-shrink properties as well as possible organoleptic improvements, facilitation of processing, or cost.

In addition to those compounds noted above, sodium benzoate and NA-11 are well known as nucleating agents for standard polypropylene compositions (such as the aforementioned plaques, containers, films, sheets, and the like) and exhibit excellent recrystallization temperatures and very quick injection molding cycle times for those purposes. The dibenzylidene sorbitol types exhibit the same types of properties as well as excellent clarity within such standard polypropylene forms (plaques, sheets, etc.). For the purposes of this invention, it has been found that the dibenzylidene sorbitol types are preferred as nucleator compounds within the target polypropylene fibers.

It has also been determined that the presence of a nucleating agent, as noted above, imparts certain other advantages to such monofilament and/or tape fiber polypropylene yarns. Included among these are creep-strain improvements to extremely high levels in order to permit utilization of such yarns in areas such as geotextile applications. Basically, the nucleating agents permit crystal arrangements within the yarns themselves such that deformity or destruction thereof is either prevented or, at least, impeded through standard use in such applications. With low-shrink properties already, increased tensile strength and modulus strength as well, the yarns also appear to exhibit such improved creep-strain as well. A noticeable difference between non-nucleated, or non-mechanically drawn nucleated, or overdrawn nucleated yarns and the inventive types exists through analysis of the crystal configurations via small angle X-ray scattering (SAXS). As noted below, there exists recognizable intensities of the scattering of signals within the equatorial and meridonal directions of the inventive nucleated and properly mechanically drawn fibers and yarns; to the contrary, the other types only exhibit signal intensities in the meridonal direction, or solely in the equatorial direction, but not both. This dual result is believed to evince the crystal configurations that provide the desired physical structure to the yarn itself for the above-discussed physical characteristics. In essence, and without intending on being bound to any specific scientific theory, it is believed that the dual equatorial and meridonal signal intensities indicate the presence of thick well-ordered lamellae interpenetrated by long, shish-shaped crystals configured in specific directions along the fiber axis within the fiber and/or yarn such that an overall strong and difficult-to-deform structure is provided.

The term "polyester" for such monofilaments means a resin that has structural units linked by ester groups (obtained through the condensation of carboxylic acids with polyhydric alcohols). Common types include polyethylene terephthalate, for example. General nucleating agents for polyesters include sodium benzoate, HPN-68, 2,6-dicarboxypyridine disodium salts, NA-21, Calcium hexahydrophthalic acid, perelynedianhydride, and the like.

The term "polyamide" for such monofilaments means a resin that has structural units linked by amide or thioamide groups (generally formed from monomers of carboxylic acids and their aminated derivatives). The most common types include nylon, such as nylon-6 and nylon-6,6. Nucleating agents for polyamides include sodium benzoate, dibenzylidene sorbitols, and the like.

The closest prior art references teach the addition of nucleator compounds to general polypropylene compositions (such as in U.S. Pat. No. 4,016,118, referenced above). However, some teachings include the utilization of certain DBS compounds within limited portions of fibers in a multicomponent polypropylene textile structure. For example, U.S. Pat. Nos. 5,798,167 to Connor et al. and U.S. Pat. No. 5,811,045 to Pike, both teach the addition of DBS compounds to polypropylene in fiber form; however, there are vital differences between those disclosures and the present invention. For example, both patents require the aforementioned multicomponent structures of fibers. Thus, even with DBS compounds in some polypropylene fiber components within each fiber type, the shrink rate for each is dominated by the other polypropylene fiber components which do not have the benefit of the nucleating agent. Also, there are no lamellae that give a long period (as measured by small-angle X-ray scattering and in accordance with integral equation (I), infra) thicker than 10.5 nm formed within the polypropylene fibers due to the lack of a post-heatsetting step being performed. Again, these thick lamellae provide the desired inventive higher heat-shrink fiber. Also of importance is the fact that, for instance, Connor et al. require a nonwoven polypropylene fabric laminate containing a DBS additive situated around a polypropylene internal fabric layer which contained no nucleating agent additive. The internal layer, being polypropylene without the aid of a nucleating agent additive, dictates the shrink rate for this structure. Furthermore, the patentees do not expose their yarns and fibers to heat-setting procedures in order to permanently configure the crystalline fiber structures of the yarns themselves as low-shrink is not their objective. In addition, none of these patentees teach to draw the fibers to a high draw ratio, and thus do not generate the high tenacity and modulus that as that is not their objective.

In addition, Spruiell, et al, *Journal of Applied Polymer Science*, Vol. 62, pp. 1965–75 (1996), reveal using a nucleating agent, MDBS, at 0.1%, to increase the nucleation rate during spinning, but not for monofilament. However, after crystallizing and drawing the fiber, Spruiell et al. do not expose the nucleated fiber to any heat, which is necessary to impart the very best shrinkage properties, therefore the shrinkage of their fibers was similar to conventional polypropylene fibers without a nucleating agent additive. Also, their residual elongation of 100% or more show that their fibers were not highly drawn, and thus exhibit low tensile and modulus values, which they report.

Of particular interest and which has been determined to be of primary importance in the production of such inventive low-shrink polypropylene fibers, is the discovery that, at the very least, the presence of nucleating agent within heat-set polypropylene fibers (as discussed herein), appears to provide very thick crystalline lamellae of the polypropylene itself. This discovery is best explained by the following:

Polymers, when crystallized from a melt under dynamic temperature and stress conditions, first supercool and then crystallize with the crystallization rate dependent on the number of nucleation sites, and the growth rate of the polymer, which are both in turn related to the thermal and mechanical working that the polymer is subjected to as it cools. These processes are particularly complex in a normal fiber drawing line. The results of this complex crystallization, however, can be measured using small angle x-ray scattering (SAXS), with the measured SAXS long period representative of an average crystallization temperature. A higher SAXS long period corresponds to thicker lamellae (which are the plate-like polymer crystals characteristic of semi-crystalline polymers like PP), and which is evidenced by a SAXS peak centered at a lower scattering angle than for comparative unnucleated polypropylene fibers. The higher the crystallization temperature of the average crystal, the thicker the measured SAXS long period will be. Further, higher SAXS long periods are characteristic of more thermally stable polymeric crystals. Crystals with shorter SAXS long periods will "melt", or relax and recrystallize into new, thicker crystals, at a lower temperature than those with higher SAXS long periods. Crystals with higher SAXS long periods remain stable to higher temperatures, requiring more heat to destabilize the crystalline structure.

In highly oriented polymeric samples such as fibers, those with higher SAXS long periods will remain stable to higher temperatures. Thus the shrinkage, which is a normal effect of the relaxation of the highly oriented polymeric samples, remains low to higher temperatures than in those highly oriented polymeric samples with lower SAXS long periods. In this invention, the nucleating additive is used in conjunction with a thermal treatment to create fibers exhibiting thicker lamellae that in turn are very stable and exhibit low shrinkage up to very high temperatures. For monofilament fibers, this apparently not only translates into low-shrink properties therein, but also high tenacity and modulus strength characteristics as well.

Also without intending on being bound to any specific scientific theory, it is believed that another function of the nucleator is to help the polymer to crystallize faster in the quench before the polymer can become highly oriented. Such orientation which occurs in the melt phase is undesirable as it occurs unevenly, with the outside of the fibers more highly oriented. These highly oriented outer sections limit the tenacity and modulus by limiting the draw ratio that can be effected in further processing. The function of the nucleator is to freeze the molten polymer in a more evenly oriented state, which then allows the draw ratio to be higher in subsequent processing, allowing for the creation of very high tensile modulus and tenacity, while continuing to effectuate low shrinkage through the creation of thicker lamellae evident in the SAXS.

Furthermore, such fibers may also be colored to provide other aesthetic features for the end user. Thus, the fibers may also comprise coloring agents, such as, for example, pigments, with fixing agents for lightfastness purposes. For this reason, it is desirable to utilize nucleating agents that do not impart visible color or colors to the target fibers. Other additives may also be present, including antistatic agents, brightening compounds, clarifying agents, antioxidants, antimicrobials (preferably silver-based ion-exchange compounds, such as ALPHASANS® antimicrobials available from Milliken & Company), UV stabilizers, fillers, and the like. Furthermore, any fabrics made from such inventive fibers may be, without limitation, woven, knit, non-woven, in-laid scrim, any combination thereof, and the like. Additionally, such fabrics may include fibers other than the inventive polypropylene fibers, including, without limitation, natural fibers, such as cotton, wool, abaca, hemp, ramie, and the like; synthetic fibers, such as polyesters, polyamides, polyaramids, other polyolefins (including non-low-shrink polypropylene), polylactic acids, and the like; inorganic fibers such as glass, boron-containing fibers, and the like; and any blends thereof.

BRIEF DESCRIPTION OF THE DRAWINGS

The accompanying drawings, which are incorporated in and constitute a part of this specification, illustrate a potentially preferred embodiment of producing the inventive low-shrink polypropylene fibers and together with the description serve to explain the principles of the invention wherein:

FIG. 1 is a schematic of the potentially preferred method of producing low-shrink monofilament polypropylene fibers.

FIG. 2 is a schematic of the potentially preferred method of producing low-shrink polypropylene tape fibers.

FIG. 3 is a presentation of the SAXS results for a non-nucleated polypropylene fiber, namely Sample #3 from Experimental Table #3, below.

FIG. 4 is a presentation of the SAXS results for a high mechanically drawn non-nucleated polypropylene fiber, namely Sample #8 from Experimental Table #3, below.

FIG. 5 is a presentation of the SAXS results of an inventive polypropylene fiber at a low mechanical draw level, namely Sample #9 from Experimental Table #3, below.

FIG. 6 is a presentation of the SAXS results of an inventive polypropylene fiber at a higher mechanical draw level, namely Sample #12 from Experimental Table #3, below.

FIG. 7 is a presentation of the SAXS results of a nucleated, but overdrawn polypropylene fiber, namely Sample m from Experimental table #5, below.

DETAILED DESCRIPTION OF THE DRAWINGS AND OF THE PREFERRED EMBODIMENT

FIG. 1 depicts the non-limiting preferred procedure followed in producing the inventive thermoplastic monofilament fibers: The entire fiber production assembly 10 comprises a mixing manifold 11 for the incorporation of molten polymer and additives (such as the aforementioned nucleator compound) which then move into a heated screw extruder 12. The extruded polymer is then passed through a metering pump 14 to a die assembly 16, whereupon the extruded fiber 17 is initially produced. The fiber 17 then immediately moves to a quenching bath 18 comprising a liquid, such as water, and the like, set at a temperature from 5 to 95° C. (here, preferably, about room temperature). The fiber 17 then moves through a series of idle rolls 20, 22, 24, whereupon the fiber 17 exhibits a high amount of adsorbed liquid (again such as water) after quenching. Thus, the fiber 17 then moves through a series of air knives 26 that pneumatically force the excess water from the fiber surface. The drawing speed of the fiber at this point is dictated by separate sets of draw rolls 28, 32 and relax rolls 36, 40 wherein the draw rolls 28, 32 are set at differing speeds of between about 30 to 800 feet/minute, preferably, with a draw ratio between the two sets 28, 32 of from 5 to about 12. The relax rolls 36, 40 are utilized for the purpose of permitting such relaxation within the fiber 17 (e.g., for the ability to elongate with substantial return to initial shape and length). Between each series of draw rolls 28, 32 and relax rolls 36, 40 are ovens 30, 34, 38 through which the fiber 17 passes. The temperatures increase in level through each oven set at temperatures of between about 280 and 450° F. After passing through such rolls 28, 32, 36, 40 and ovens 30, 34, 38, the finished, crystal-oriented monofilament fiber 50 passes through a series of winding rolls 42, 44, 46 that leads to a spool (not illustrated) for winding of the finished fiber 50.

FIG. 2 depicts the non-limiting preferred procedure followed in producing the inventive low-shrink polypropylene tape fibers. The entire fiber production assembly 110 comprises a mixing manifold 111 for the incorporation of molten polymer and additives (such as the aforementioned nucleator compound) which then move into an extruder 112. The extruded polymer is then passed through a metering pump 114 to a die assembly 116, whereupon the film 117 is produced. The film 117 then immediately moves to a quenching bath 18 comprising a liquid, such as water, and the like, set at a temperature from 5 to 95° C. (here, preferably, about room temperature). The drawing speed of the film at this point is dictated by draw rolls and tensionsing rolls 120, 122, 124, 126, 128 set at a speed of about 100 feet/minute, preferably, although the speed could be anywhere from about 20 feet/minute to about 200 feet/minute, as long as the initial drawing speed is at most about $\frac{1}{5}^{th}$ that of the heat-draw speed later in the procedure. The quenched film 119 should not exhibit any appreciable crystal orientation of the polymer therein for further processing. Sanding rolls 130, 131, 132, 133, 134, 135, may be optionally utilized for delustering of the film, if desired. The quenched film 119 then moves into a cutting area 136 with a plurality of fixed knives 138 spaced at any distance apart desired. Preferably, such knives 138 are spaced a distance determined by the equation of the square root of the draw speed multiplied by the final width of the target fibers (thus, with a draw ratio of 5:1 and a final width of about 3 mm, the blade gap measurements should be about 6.7 mm). Upon slitting the quenched film 119 into fibers 140, such fibers are moved uniformly through a series of nip and tensioning rolls 142, 143, 144, 145 prior to being drawn into a high temperature oven 146 set at a temperature level of between about 280 and 350° C., in this instance about 310° C., at a rate as noted above, at least 5 times that of the initial drawing speed. Such an increased drawing speed is effectuated by a series of heated drawing rolls 148, 150 (at temperatures of about 360–400° F. each) over which the now crystal-oriented fibers 154 are passed. A last tensioning roll 152 leads to a spool (not illustrated) for winding of the finished tape fibers 154.

The remaining Figures are described in detail below.

Inventive Fiber and Yarn Production

The following non-limiting examples are indicative of the preferred embodiment of this invention:
Yarn Production

EXAMPLE 1

Slit Film Tape

Nucleator concentrate was made by mixing powder phase nucleator with powdered polypropylene, PP, resin with an MFI of 35 g/10 min (Basell PDC1302) in a high speed mixer at 10% concentration, extruded through a twin screw extruder at an extruder temperature of 240° C., and then cut into concentrate pellets. Concentrates were made of both Millad 3988 (DMDBS) and Millad 3940 (p-MDBS) and were let down into a PP resin with a melt flow of 3.5–3.8 g/10 min (Huntsman P4G320050) at a level of 2.25% to give 0.225% (2250 ppm) nucleator concentration in the final polymer. This mixture, consisting of PP resin and the additive nucleator, was extruded using a single screw extruder through a film dye approximately 72 inches wide. The PP melt throughput was adjusted to give a final tape thickness of approximately 0.002 inches. The molten film was quenched in room temperature (about 25° C.) water and transferred by rollers to a battery of knives, which cut it into parallel strips. During production, the film appeared clear. The film, having been slit into strips, was run across three large rolls (rolls 1–3) all rotating at speeds between 61 and 94 ft/min (dependent on draw ratio) and then into an oven, approximately 14 ft long set at a temperature between 330 and 315° F. where it was drawn. After leaving the oven, the film strips were transferred to three more rolls (rolls 4–6), the first of which (roll 4) was rotating at speeds between 545 and 580 ft/min (dependent on draw ratio) while the second two (rolls 5 and 6) were rotating at speeds between 500 and 530 ft/min (dependent on relax ratio). Roll 6 is heated to a temperature between 340 and 400° F. The drawn and heatset film strips were then traversed to winders where they were individually wound. These final film strips are thus referred to as the polypropylene tape fibers.

Several tape fibers were made in this manner, adjusting the draw ratio (rotational speed ratio between the $3^{rd}$ and $4^{th}$ rolls), heat set temperature (temperature of the roll 6) and relax ratio (rotational speed ratio between the $4^{th}$ and $5^{th}$ rolls). These tape fibers were tested for tensile properties using an MTS Sintech 10/G instrument. They were also tested for shrinkage with an FST 3000 Shrinkage Tester available from Lawson-Hemphill with the heater plates set at 117° C. and a suspended weight of 8 g. Shrinkage was calculated as the average shrinkage of five samples compared in relation to the initial lengths before heat exposure. The nucleator concentration in the tape fiber was also measured by gas chromatography. All of these results are reported in the tables below for different fibers (with the denier measured in g/9000 m).

TABLE 1

Processing conditions of Specific Tape Fiber Samples

| Sample | Nucleator | Level (ppm) | Roll 3 | Roll 4 | Roll 6 | Oven (° C.) | Heatset (° C.) | Draw Ratio | Relax Ratio |
|---|---|---|---|---|---|---|---|---|---|
| A | Control | 0 | 67 | 550 | 500 | 315 | 363 | 8.2 | 10 |
| B | Control | 0 | 71 | 550 | 500 | 315 | 363 | 7.7 | 10 |
| C | MDBS | 2250 | 61 | 545 | 500 | 315 | 340 | 8.9 | 9 |
| D | MDBS | 2250 | 61 | 545 | 530 | 315 | 340 | 8.9 | 2.8 |
| E | MDBS | 2250 | 94 | 580 | 500 | 315 | 340 | 6.2 | 16 |
| F | MDBS | 2250 | 81 | 550 | 500 | 315 | 340 | 6.8 | 10 |
| G | MDBS | 2250 | 85 | 580 | 500 | 315 | 340 | 6.8 | 16 |
| H | MDBS | 2250 | 75 | 550 | 500 | 315 | 340 | 7.3 | 10 |
| I | MDBS | 2250 | 79 | 580 | 500 | 315 | 340 | 7.3 | 16 |
| J | MDBS | 2250 | 79 | 580 | 500 | 330 | 340 | 7.3 | 16 |
| K | MDBS | 2250 | 75 | 550 | 500 | 330 | 340 | 7.3 | 10 |
| L | MDBS | 2250 | 81 | 550 | 500 | 330 | 340 | 6.8 | 10 |
| M | MDBS | 2250 | 85 | 580 | 500 | 330 | 340 | 6.8 | 16 |
| N | DMDBS | 2250 | 85 | 580 | 500 | 330 | 340 | 6.8 | 16 |
| O | DMDBS | 2250 | 81 | 550 | 500 | 330 | 340 | 6.8 | 10 |
| P | DMDBS | 2250 | 79 | 580 | 500 | 330 | 340 | 7.3 | 16 |
| Q | DMDBS | 2250 | 75 | 550 | 500 | 330 | 340 | 7.3 | 10 |
| R | DMDBS | 2250 | 75 | 550 | 500 | 315 | 340 | 7.3 | 10 |
| S | DMDBS | 2250 | 79 | 580 | 550 | 315 | 340 | 7.3 | 5.5 |
| T | DMDBS | 2250 | 85 | 580 | 500 | 315 | 340 | 6.8 | 16 |
| U | DMDBS | 2250 | 81 | 550 | 500 | 315 | 340 | 6.8 | 10 |
| V | DMDBS | 2250 | 61 | 545 | 500 | 315 | 340 | 8.9 | 9 |
| W | DMDBS | 2250 | 61 | 545 | 530 | 315 | 340 | 8.9 | 2.8 |
| X | DMDBS | 2250 | 61 | 545 | 500 | 315 | 350 | 8.9 | 9 |
| Y | DMDBS | 2250 | 61 | 545 | 500 | 315 | 360 | 8.9 | 9 |
| Z | DMDBS | 2250 | 61 | 545 | 500 | 315 | 370 | 8.9 | 9 |
| AA | DMDBS | 2250 | 61 | 545 | 500 | 315 | 380 | 8.9 | 9 |
| BB | DMDBS | 2250 | 61 | 545 | 500 | 315 | 390 | 8.9 | 9 |
| CC | DMDBS | 2250 | 61 | 545 | 500 | 315 | 400 | 8.9 | 9 |

EXAMPLE #2

Monofilament

Nucleator concentrate (DMDBS) was made by mixing powder phase nucleator with powdered PP resin with an MFI of 35 (Basell PDC1302) in a high speed mixer at a 10% concentration, extruded through a twin screw extruder at an extruder temperature of 240° C., and cut into concentrate pellets. The concentrates were let down into two PP resins: the first with an MFI of 12–18 g/10 min (Exxon 1154) and the second with an MFI of 4 g/10 min (Exxon 2252) at a level of 2.25% to give 0.225% (2250 ppm) nucleator concentration in the final polymer. This mixture, consisting of PP resin and the additive nucleator, was extruded using a single screw extruder through monofilament spinnerets with 60 holes. The PP melt throughput was adjusted to give a final monofilament denier of approximately 520 g/9000 m. The molten strands of filament were quenched in room temperature water (about 25° C.), and then transferred by rollers to a battery of airs knives, which dried the filaments. The filaments, having been dried, were run across the first of four sets of large rolls, all rotating at a speed of between 49 and 126 ft/min (dependent on draw ratio), before entering an oven approximately 14 ft long set to a temperature of 360° F. After leaving the first oven, the filaments were transferred to the second set of large rollers running at a speed of 524 ft/min (dependent on draw ratio) and then into second oven, set at a temperature of 360° F. The final two sets of rolls were both set at 630 ft/min and the oven between them was set at a temperature of 300° F. The individual monofilament fibers were then traversed to winders where they were individually wound. These final fibers are thus referred to as the PP monofilaments.

Several monofilament fibers were made in this manner, adjusting the PP resin and draw ratio (rotational speed ratio between the $1^{st}$ and $3^{rd}$ set of rolls). These monofilament fibers were tested for tensile properties using an MTS Sintech 10/G instrument. They were also tested for shrinkage in an FST 3000 shrinkage tester available from Lawson-Hemphill with the heater plates set to 117° C. and a suspended weight of 8 g. linkage was calculated as the average shrinkage of five samples compared in relation to initial lengths before heat exposure. The nucleator concentration of the monofilament fiber was also measured by gas chromatography. All of these results are reported in the tables below for different fibers (with the denier measured in g/9000 m).

EXPERIMENTAL TABLE #3
Processing conditions of Specific Monofilament Fiber Physical Characteristics

| Sample | Resin | Nucleator | Level (ppm) | Draw Ratio |
|---|---|---|---|---|
| 1 | 1154 | N/A | 0 | 6 |
| 2 | 1154 | N/A | 0 | 7 |
| 3 | 1154 | N/A | 0 | 8 |
| 4 | 1154 | N/A | 0 | 9 |
| 5 | 1154 | N/A | 0 | 10 |
| 6 | 1154 | N/A | 0 | 11 |
| 7 | 1154 | N/A | 0 | 12 |
| 8 | 1154 | N/A | 0 | 13 |
| 9 | 1154 | DMDBS | 2250 | 11 |
| 10 | 1154 | DMDBS | 2250 | 12 |
| 11 | 1154 | DMDBS | 2250 | 13 |
| 12 | 1154 | DMDBS | 2250 | 14 |
| 13 | 2252 | N/A | 0 | 5 |
| 14 | 2252 | N/A | 0 | 6 |
| 15 | 2252 | N/A | 0 | 7 |
| 16 | 2252 | N/A | 0 | 8 |
| 17 | 2252 | DMDBS | 2250 | 8 |
| 18 | 2252 | DMDBS | 2250 | 9 |
| 19 | 2252 | DMDBS | 2250 | 10 |
| 20 | 2252 | DMDBS | 2250 | 11 |
| 21 | 2252 | DMDBS | 2250 | 12 |
| 22 | 2252 | DMDBS | 2250 | 13 |
| 23 | 2252 | DMDBS | 2250 | 14 |
| 24 | 1154 | N/A | 0 | 6.5 |

EXAMPLE #3

Monofilament

Nucleator concentrate (DMDBS and p-MDBS) was made by mixing powder phase nucleator with powdered PP resin with an MFI of 35 (Basell PDC1302) in a high speed mixer at a 10% concentration, extruded through a twin screw extruder at an extruder temperature of 240° C., and cut into concentrate pellets. The concentrates were let down into a homopolymer polypropylene resins with an MFI of 12–18 g110 min (Exxon 1154) at a level of 2.25% to give 0.225% (2250 ppm) nucleator concentration in the final polymer. This mixture, consisting of PP resin and the additive nucleator, was extruded using a single screw extruder through monofilament spinnerets with 40 holes. The PP melt throughput was adjusted to give a final monofilament denier of approximately 520 g/9000 m. The molten strands of filament were quenched in room temperature water (about 25° C.), and then transferred by rollers to a battery of airs knives, which dried the filaments. The filaments, having been dried, were run across the first of four sets of large rolls, all rotating at a speed of between 38 and 49 ft/min (dependent on draw ratio), before entering an oven approximately 14 ft long set to a temperature of either 300 or 380° F. After leaving the first oven, the filaments were transferred to the second set of large rollers running at a speed of about 524 ft/min (dependent on draw ratio) and then into second oven, set at a temperature of 320 or 400° F. The final two sets of rolls were both set at 630 ft/min and the oven between them was set at a temperatures of either 350, 400 or 420° F. The individual monofilament fibers were then traversed to winders where they were individually wound. These final fibers are thus referred to as the PP monofilaments.

Several monofilament fibers were made in this manner, adjusting the PP resin and the draw ratio (rotational speed ratio between the $1^{st}$ and $3^{rd}$ set of rolls). These monofilament fibers were tested for tensile properties using an MTS Sintech 10/G instrument. They were also tested for shrinkage in an FST 3000 shrinkage tester available from Lawson-Hemphill with the heater plates set to 117° C. and a suspended weight of 8 g. Shrinkage was calculated as the average shrinkage of five samples compared in relation to the initial lengths before heat exposure. The nucleator concentration of the monofilament fiber was also measured by gas chromatography. All of these results are reported in the tables below for different fibers (with the denier measured in g/9000 m).

TABLE 3

Processing conditions of Specific Monofilament Fiber

| Sample | Resin | Nucleator | Level (ppm) | Draw Ratio | Relax Ratio | Oven 1 (° F.) | Oven 2 (° F.) | Oven 3 (° F.) |
|---|---|---|---|---|---|---|---|---|
| a | 1154 | N/A | 0 | 12.9 | 11.1 | 300 | 320 | 350 |
| b | 1154 | N/A | 0 | 12.9 | 11.1 | 300 | 320 | 400 |
| c | 1154 | N/A | 0 | 15.7 | 11.1 | 380 | 400 | 400 |
| d | 1154 | N/A | 0 | 15.7 | 11.1 | 380 | 400 | 420 |
| e | 1154 | N/A | 0 | 12.9 | 11.1 | 300 | 320 | 350 |
| f | 1154 | DMDBS | 2250 | 12.9 | 11.1 | 300 | 320 | 400 |
| g | 1154 | DMDBS | 2250 | 13.4 | 11.1 | 380 | 400 | 420 |
| h | 1154 | DMDBS | 2250 | 12.9 | 11.1 | 320 | 320 | 350 |
| i | 1154 | p-MDBS | 2250 | 12.9 | 11.1 | 320 | 320 | 400 |

TABLE 3-continued

Processing conditions of Specific Monofilament Fiber

| Sample | Resin | Nucleator | Level (ppm) | Draw Ratio | Relax Ratio | Oven 1 (° F.) | Oven 2 (° F.) | Oven 3 (° F.) |
|---|---|---|---|---|---|---|---|---|
| j | 1154 | p-MDBS | 2250 | 12.9 | 11.1 | 300 | 320 | 350 |
| k | 1154 | p-MDBS | 2250 | 12.9 | 11.1 | 300 | 320 | 400 |
| l | 1154 | p-MDBS | 2250 | 12.9 | 1.6 | 320 | 340 | 400 |
| m | 1154 | p-MDBS | 2250 | 16.6 | 1.6 | 340 | 360 | 400 |

EXAMPLE #4

Monofilament Yarn

Nucleator concentrate was made by mixing Millad powder with powdered polypropylene resin with a MFI of 35 in a high speed mixer at a 10% concentration, then extruded through a twin screw extruder at an extruder temperature of 240° C., and then cut into concentrate pellets. Concentrates were made of both Millad 3988 (DMDBS) and Millad 3940 (p-MDBS). These concentrates were let down into polypropylene resin with MFI 12-18 at a level of 2.2%, to give 0.22% (2200 ppm) nucleator concentration in the final polymer concentration. This yarn was extruded through a single screw extruder at a temperature of 490° F. and extruded through a dye into a water quench bath. The quenched fibers are wrapped over four sets of draw rolls and passed through three ovens in between them in order to draw the fiber and impart the final physical properties. The temperatures and roll speeds are given in the table below.

TABLE 4

Yarn Samples with Specific Nucleators Added

| Sample | Nucleator Added | Roll Speeds (ft/min) #1 | #2 | #3 | #4 | Oven Temps. (° F.) #1 | #2 | #3 | Draw Ratio |
|---|---|---|---|---|---|---|---|---|---|
| i | None | 75 | 524 | 630 | 580 | 300 | 320 | 350 | 8.4 |
| ii | None | 86 | 519 | 628 | 557 | 300 | 320 | 350 | 7.3 |
| iii | None | 86 | 518 | 628 | 557 | 325 | 345 | 350 | 7.3 |
| iv | None | 75 | 524 | 630 | 558 | 325 | 345 | 350 | 8.4 |
| v | None | 75 | 524 | 630 | 580 | 325 | 345 | 410 | 8.4 |
| vi | None | 86 | 520 | 630 | 557 | 325 | 345 | 410 | 7.33 |
| vii | None | 86 | 520 | 630 | 557 | 300 | 320 | 410 | 7.33 |
| viii | None | 75 | 524 | 630 | 557 | 300 | 320 | 410 | 8.4 |
| ix | DMDBS | 75 | 524 | 630 | 557 | 300 | 320 | 350 | 8.4 |
| x | DMDBS | 86 | 520 | 630 | 557 | 300 | 320 | 350 | 7.33 |
| xi | DMDBS | 55 | 453 | 610 | 560 | 300 | 320 | 350 | 11.09 |
| xii | DMDBS | 86 | 520 | 630 | 557 | 325 | 345 | 350 | 7.33 |
| xiii | DMDBS | 75 | 522 | 630 | 557 | 325 | 345 | 350 | 8.4 |
| xiv | DMDBS | 75 | 522 | 630 | 557 | 325 | 345 | 410 | 8.4 |
| xv | DMDBS | 86 | 520 | 630 | 557 | 325 | 345 | 410 | 7.33 |
| xvi | DMDBS | 86 | 520 | 630 | 557 | 300 | 320 | 410 | 7.33 |
| xvii | DMDBS | 75 | 520 | 630 | 557 | 300 | 320 | 410 | 8.4 |
| xviii | MDBS | 75 | 525 | 630 | 557 | 300 | 320 | 350 | 8.4 |
| xix | MDBS | 86 | 520 | 630 | 557 | 300 | 320 | 350 | 7.33 |
| xx | MDBS | 55 | 450 | 618 | 557 | 300 | 320 | 350 | 11.2 |
| xxi | MDBS | 75 | 522 | 630 | 557 | 325 | 345 | 350 | 8.4 |
| xxii | MDBS | 86 | 524 | 630 | 557 | 325 | 345 | 350 | 7.33 |
| xxiii | MDBS | 86 | 524 | 630 | 559 | 325 | 345 | 410 | 7.33 |
| xxiv | MDBS | 75 | 521 | 629 | 557 | 325 | 345 | 350 | 8.39 |
| xxv | MDBS | 75 | 524 | 630 | 559 | 300 | 320 | 410 | 8.4 |
| xxvi | MDBS | 86 | 524 | 630 | 559 | 300 | 320 | 410 | 7.33 |

Fiber and Yarn Physical Analyses

These sample yarns were then tested for a number of different properties, as noted below:

EXPERIMENTAL TABLE #1
Experimental Physical Characteristic Measurements for Sample Tape Fibers

| Sample | Denier (g/9000 m) | Shrinkage (%) | Tenacity (gf/denier) | 3% Secant Modulus (gf/denier) |
|---|---|---|---|---|
| A | 880 | 10.6 | 4.3 | 48.9 |
| B | 902 | 12 | 4.3 | 48.5 |
| C | 1050 | 14 | 5 | 68.1 |
| D | 1058 | 16.2 | 4.5 | 75.5 |
| E | 1165 | 5 | 4.5 | 35.0 |
| F | 1037 | 8.6 | 4.5 | 47.5 |
| G | 1034 | 10.7 | 4.4 | 44.6 |

-continued

EXPERIMENTAL TABLE #1
Experimental Physical Characteristic Measurements
for Sample Tape Fibers

| Sample | Denier (g/9000 m) | Shrinkage (%) | Tenacity (gf/denier) | 3% Secant Modulus (gf/denier) |
|---|---|---|---|---|
| H | 1033 | 12.5 | 5.1 | 52.4 |
| I | 1022 | 12.2 | 4.3 | 50.0 |
| J | 1018 | 9.4 | 4.5 | 41.4 |
| K | 1024 | 11.1 | 5.1 | 46.8 |
| L | 1027 | 7.1 | 4.3 | 46.6 |
| M | 1031 | 7.6 | 4.6 | 41.6 |
| N | 1043 | 8.8 | 5.5 | 40.2 |
| O | 1041 | 9.3 | 4.2 | 45.3 |
| P | 1018 | 10.1 | 4.5 | 41.6 |
| Q | 1030 | 11.7 | 4.2 | 48.1 |
| R | 1016 | 13.2 | 5.2 | 45.9 |
| S | 1037 | 12.5 | 5.1 | 45.0 |
| T | 1039 | 10.5 | 4.5 | 43.1 |
| U | 1129 | 12.6 | 4.7 | 40.1 |
| V | 1029 | 17.8 | 4.8 | 63.6 |
| W | 965 | 18.2 | 4.5 | 74.4 |
| X | 1018 | 16.5 | 4.7 | 66.0 |
| Y | 1023 | 15.7 | 4.4 | 59.1 |
| Z | 1021 | 9.5 | 4.2 | 54.3 |
| AA | 1098 | 7 | 3.5 | 44.6 |
| BB | 1043 | 4.2 | 3.9 | 40.2 |
| CC | 1086 | 3.8 | 3.9 | 36.9 |

From these PP tape fibers, several comparative examples with and without nucleator were analyzed for creep testing. Creep-Strain measurements were performed by first determining the ultimate breaking strength of each of the sample tape fibers. A section of tape was then cut to be approximately 70 inches long. The ends of a tape section were tied in a knot to form a loop. A ½ inch steel pipe was then place inside the top of the loop adjacent to the knotted end. Then two ends of the loop were wrapped in opposite directions around the steel pipe to isolate the knot from the hanging loop of tape fiber. The final mounted sample measured approximately 30 inches in length when a small weight (20 g) was suspended in the loop. The steel pipe was then suspended in a frame and the initial length of the tape loop was measured ($L_0$). A weight equal to 50% of the ultimate breaking strength of the loop of tape fiber was suspend from the loop (Note: because there is a loop of tape used in the measurement, there are actually two tape fiber segments, one on either side of the weight, so 50% of the ultimate strength of the loop is the same as the ultimate strength of a single tape fiber). The length of the tape loop (L) was then measured at distinct intervals of time. The time of the strain, $\epsilon$, to exceed 10% under a 50% load was then determined. Five samples were tested for creep-strain behavior, specifically Samples A, C, D, V and W were tested with weights of 3744 g, 5289 g, 4724 g, 5063 g, 4305 g respectively, which corresponds to 50% of the ultimate breaking strength of the sample loop. The results of these tests are reported in the table below.

EXPERIMENTAL TABLE #2
Creep-Strain Results for 50% of the Ultimate Breaking Strength for Sample Tape Fibers

| | % Strain | | | | |
|---|---|---|---|---|---|
| Time | Sample A | Sample C | Sample D | Sample V | Sample W |
| 0 s | 0 | 0 | 0 | 0 | 0 |
| 15 s | 7.04 | 5.36 | 4.67 | 5.13 | 3.38 |
| 30 s | 7.46 | 5.58 | 4.91 | 5.62 | 3.83 |
| 1 min | 7.89 | 6.03 | 5.37 | 5.87 | 4.28 |
| 2 mins | 8.10 | 6.47 | 5.84 | 6.36 | 4.73 |
| 5 mins | 8.32 | 6.92 | 5.84 | 6.85 | 5.18 |
| 8 mins | 9.17 | — | 6.07 | — | — |
| 10 mins | 9.17 | 7.59 | 6.07 | 7.33 | 5.41 |
| 20 mins | 9.81 | 8.04 | 6.54 | 8.07 | 5.63 |
| 30 mins | 10.23 | 8.48 | 6.54 | 8.07 | 6.08 |
| 1 hr | 10.87 | 9.15 | 7.48 | 8.80 | 6.76 |
| 2 hrs | 11.73 | 9.82 | 7.48 | 9.05 | 6.98 |
| 5 hrs | 12.37 | 10.71 | 8.18 | 9.54 | 7.66 |
| 8 hrs | 13.01 | 11.38 | 8.41 | 10.51 | 7.66 |
| 1 day | 14.29 | 12.50 | 9.35 | 11.49 | 8.56 |
| 2 days | 14.71 | 13.62 | 9.81 | 12.47 | 8.78 |
| 3 days | 15.35 | 14.51 | 10.28 | — | 9.91 |
| 4 days | — | 14.96 | — | — | — |
| 5 days | — | — | — | 13.69 | — |
| 6 days | 16.42 | — | 10.75 | — | — |
| 7 days | — | 16.29 | — | — | — |

Thus, the inventive tape fibers (C, D, V, and W) provide excellent low creep-strain behavior with improved physical characteristics such as higher tenacities, acceptably low shrinkage, and increased modulus. In particular, the control fiber (normucleated) exhibited a time to 10% elongation of roughly 30 minutes, whereas the inventive fibers exhibited such time to 10% elongation times of 5 hours, 3 days (72 hours), 8 hours, and 72 hours, respectively.

EXPERIMENTAL TABLE #3
Processing conditions of Specific Monofilament Fiber Physical Characteristics

| Sample | Denier g/9000 m | Tenacity (gf/den) | 3% Modulus (gf/den) | Shrinkage (%) |
|---|---|---|---|---|
| 1 | 520 | 2.8 | 31.5 | 4.4 |
| 2 | 520 | 3.5 | 39.5 | 5.5 |
| 3 | 520 | 3.9 | 51.8 | 6.5 |
| 4 | 520 | 4.2 | 65.3 | 7.8 |
| 5 | 520 | 3.8 | 80.7 | 7.8 |
| 6 | 520 | 5.6 | 100.0 | 9.2 |
| 7 | 520 | 6.4 | 118.4 | 8.7 |
| 8 | 520 | 5.9 | 132.6 | 8.2 |
| 9 | 520 | 6.3 | 79.5 | 3.8 |
| 10 | 520 | 7.1 | 93.5 | 3.8 |
| 11 | 520 | 6.9 | 109.9 | 3.5 |
| 12 | 520 | 6.5 | 126.0 | 3.6 |
| 13 | 520 | 3.5 | 38.6 | 4.2 |
| 14 | 520 | 4.9 | 51.0 | 5.8 |
| 15 | 520 | 4.0 | 63.6 | 6.7 |
| 16 | 520 | 4.5 | 74.0 | 7.4 |
| 17 | 520 | 5.3 | 57.5 | 4.5 |
| 18 | 520 | 6.2 | 73.5 | 4.7 |
| 19 | 520 | 6.5 | 83.1 | 5.3 |
| 20 | 520 | 7.2 | 101.4 | 5.2 |
| 21 | 520 | 7.1 | 115.5 | 5.3 |
| 22 | 520 | 7.2 | 130.7 | 5.5 |
| 23 | 520 | 7.7 | 140.3 | 5.2 |
| 24 | 520 | 4.5 | 45.2 | 12.7 |

From these PP monofilament fibers, several comparative examples of each resin with and without nucleator were selected for creep testing. Creep-Strain measurements were performed as outline in Example 1. Five samples were tested for creep-strain behavior. Specifically, Samples 7, 12, 16, 22, and 24 were tested with weights of 3323 g, 3287 g, 2320 g, 3726 g and 2360 g respectively, which corresponds to 50% of the ultimate breaking strength of the sample loop. The results of these tests are reported in the table below.

EXPERIMENTAL TABLE #4
Creep-Strain Results for 50% of the Ultimate Breaking Strength for Monofilament Fibers

| Time | % Strain | | | | |
|---|---|---|---|---|---|
| | Sample 7 | Sample 12 | Sample 16 | Sample 22 | Sample 24 |
| 0 s | 0 | 0 | 0 | 0 | 0 |
| 15 s | 4.57 | 3.59 | 5.86 | 3.77 | 8.55 |
| 30 s | 4.81 | 4.02 | 6.31 | 4.60 | 9.40 |
| 1 min | 4.81 | 4.44 | 6.53 | 5.44 | 10.04 |
| 2 mins | 5.05 | 4.65 | 6.76 | 5.44 | 10.26 |
| 5 mins | 5.29 | 4.65 | 7.21 | 5.65 | 11.54 |
| 10 mins | 5.53 | 4.86 | 7.88 | 5.86 | 13.25 |
| 20 mins | 5.77 | 5.50 | 8.11 | 6.28 | 13.68 |
| 30 mins | 6.01 | 5.71 | 8.33 | 6.49 | 14.53 |
| 1 hr | 6.25 | 5.92 | 8.78 | 7.11 | 16.45 |
| 2 hrs | 7.21 | 6.34 | 9.23 | 7.32 | 17.95 |
| 5 hrs | 7.21 | 6.77 | 9.91 | 7.74 | 20.94 |
| 8 hrs | 7.45 | 7.19 | 10.36 | 8.37 | 23.93 |
| 1 day | 7.69 | 7.40 | 11.71 | 9.00 | 30.13 |
| 2 days | 8.41 | 8.46 | 12.39 | 9.62 | 44.87 |
| 3 days | 8.89 | 9.09 | 13.06 | 10.04 | — |
| 4 days | 9.13 | 9.30 | 13.29 | 10.25 | — |
| 7 days | — | 9.51 | — | 10.88 | — |
| 8 days | — | 10.15 | — | 11.09 | — |
| 9 days | 9.86 | 10.15 | 14.41 | 11.30 | — |
| 10 days | — | 10.78 | — | 11.51 | — |
| 11 days | — | 10.99 | — | 11.51 | — |
| 14 days | — | 10.99 | — | 11.92 | — |
| 15 days | — | 11.21 | — | 11.92 | — |

Thus, the inventive monofilament fibers (12 and 22) provide excellent low creep-strain behavior with improved physical characteristics such as higher tenacities, lower shrinkage, and increased modulus. In particular, the control fibers (normucleated; 7, 16, and 24) exhibited times to 10% elongation of roughly 9 days (216 hours)(but at very high shrinkage levels), 8 hours (at high shrinkage), and 1 minute, whereas the inventive fibers exhibited such time to 10% elongation times of 8 days (192 hours) and 3 days (72 hours), respectively EXPERIMENTAL TABLE #5
Monofilament Fiber Physical Characteristics

| Sample | Denier g/9000 m | Tenacity (gf/den) | 3% Modulus (gf/den) | Shrinkage (%) |
|---|---|---|---|---|
| a | 534 | 5.6 | 84.3 | 6.9 |
| b | 529 | 5.6 | 78.9 | 5.1 |
| c | 534 | 5.9 | 84.7 | 1.1 |
| d | 500 | 6.1 | 90.0 | 1.5 |
| e | 522 | 6.3 | 84.8 | 2.4 |
| f | 520 | 6.4 | 79.2 | 2.5 |
| g | 525 | 4.4 | 43.9 | 0.2 |
| h | 524 | 6.2 | 85.3 | 1.6 |
| i | 526 | 6.5 | 77.7 | 2.1 |
| j | 530 | 6.1 | 82.7 | 1.8 |
| k | 509 | 5.7 | 77.5 | 2.5 |
| l | 477 | 5.9 | 112.0 | 3.9 |
| m | 479 | 5.8 | 144.0 | 3.3 |

Thus, the inventive monofilament fibers provide excellent low creep-strain behaviour with improved physical characteristics such as higher tenacities, lower shrinkage and increased modulus.

The sample with improved yarns for Example #4 were tested for shrink characteristics at a 150° C. heat exposed conditions (hot air). The results are tabulated below, as well as for tenacity, 3% secant modules, and denier:

EXPERIMENTAL TABLE #6
Experimental Physical Characteristic Measurements for Sample Yarns

| Sample | Shrinkage Denier | Test (° C.) | Shrinkage | Tenacity (gf/denier) | 3% Sec. Modulus (gf/den) |
|---|---|---|---|---|---|
| i | 519 | 150 Hot air | 15% | 5.306 | 51.66 |
| ii | 522 | " | 13% | 4.519 | 45.18 |
| iii | 494 | " | 6.1% | 4.402 | 44.94 |
| iv | 517 | " | 8.6% | 4.898 | 48.30 |
| v | 526 | " | 3.9% | 3.261 | 33.52 |
| vi | 518 | " | 3.2% | 3.508 | 31.78 |
| vii | 514 | " | 2.4% | 2.763 | 30.18 |
| viii | 516 | " | 4.3% | 3.046 | 35.19 |
| ix | 504 | " | 1.8% | 5.577 | 54.00 |
| x | 505 | " | 1.6% | 5.226 | 43.96 |
| xi | 497 | " | 2.2% | 5.712 | 82.87 |
| xii | 517 | " | 0.8% | 3.734 | 32.86 |
| xiii | 510 | " | 0.6% | 5.009 | 43.28 |
| xiv | 495 | " | 0.4% | 4.511 | 38.74 |
| xv | 506 | " | −0.02% | 2.918 | 29.679 |
| xvi | 506 | " | 0.3% | 3.190 | 31.76 |
| xvii | 513 | " | 0.9% | 3.413 | 36.22 |
| xviii | 513 | " | 1.7% | 5.363 | 54.15 |
| xix | 506 | " | 1.3% | 4.673 | 46.84 |
| xx | 495 | " | 1.6% | 5.240 | 82.41 |
| xxi | 516 | " | 0.6% | 4.842 | 43.99 |
| xxii | 524 | " | 0.8% | 3.727 | 34.13 |
| xxiii | 508 | " | 0.5% | 4.038 | 36.70 |
| xxiv | 519 | " | 1.2% | 4.67 | 40.53 |
| xxv | 528 | " | 0.5% | 4.553 | 37.72 |
| xxvi | 502 | " | −0.1% | 3.011 | 30.44 |

Thus, the inventive fibers exhibit excellent high tenacity and modulus strength levels as well as simultaneously low shrinkage rates, characteristics that have heretofore been simultaneously unattainable for monofilament thermoplastic fibers.

X-ray Scattering Analysis-Long Period

The monofilament samples were studied by small angle x-ray scattering (SAXS) to identify differences in the polymer long period spacing as well as differences in the equatorial scattering arising from differences in the densities of the scattering objects (i.e. crystalline vs. amorphous regions). The SAXS data were collected on a Bruker AXS (Madison, Wis.) Hi-Star multi-wire detector placed at a distance of 105.45 cm from the sample in an Anton-Paar vacuum. X-rays ($\lambda$=0.154178 nm) were generated with a MacScience rotating anode (40 kV, 40 mA) and focused through three pinholes to a size of 0.2 mm. The entire system (generator, detector, beampath, sample holder, and software) is commercially available as a single unit from Bruker AXS. The detector was calibrated per manufacturer recommendation using a sample of silver behenate.

A typical data collection was conducted as follows. A single polypropylene monofilament was placed in the x-ray beam inside an Anton-Paar vacuum sample chamber on the x-ray equipment. The sample chamber and beam path was evacuated to less than 100 mTorr and the sample was exposed to the X-ray beam for one hour. Two-dimensional data frames were collected by the detector and unwarped automatically by the system software.

To obtain the long-period spacing, the data were smoothed within the system software using a 2-pixel convolution prior to integration. From this smoothed data frame, the intensity scattering data as a function of scattering angle were integrated with the manufacturer's software over a 2Θ range of 0.2°–2.5° in increments of 0.01° using the method of bin summation. These raw scattering data were then transformed into a real space correlation function K(z) using a FORTRAN program written in house to evaluate the integral (I):

$$K(z) = \int_0^\infty 4\pi q^2 I(q)\cos(qz)\,dq \text{ where } q = 4\pi\sin(\theta)/\lambda. \quad (I)$$

The integral was evaluated by direct summation over all values 2Θ in the data range (0.2°–2.5°) and over the real space values from 0 nm –50 nm. This follows the method of G. Strobl (Strobl G. *The Physics of Polymers*; Springer: Berlin 1997, pp. 408–14), entirely incorporated by reference. From the one-dimensional correlation function, K(z), one can extract morphological data of interest, in this case long period spacing. The integrated intensity data I(Θ)) as a function of 2Θ demonstrates a broad hump corresponding to the long period spacing. The K(z) function has a characteristic shape and the first peak maximum is the long-period spacing. Long period was confirmed by manual examination of the I(Θ) vs. 2Θ plots in cases where the long period is large and close to the beam stop. The peak maximum can be converted to long period by application of Bragg's Law, namely 2d sin Θ=λ, where d=long period.

An analysis of the scattered intensity distribution (2Θ= 0.2°–2.5°) into the equatorial or meridonal directions was calculated from the unsmoothed data frames by dividing the scattering into 2 regions: an equatorial scattering region [I(Eq)], which is comprised of the 20° region centered about the fiber normal direction on each half of the frame and the meridonal scattering region [I(Me)] which is comprised of the 160° of diffraction space centered about the fiber axis on each side of the data frame. Total counts were summed for each of the two regions and the ratio [I(Me)/I(Eq)] calculated and reported.

SAXS analysis of PP monofilaments as described herein illustrates the change in morphology of the filaments under increasing draw ratio. FIG. 3 is the SAXS pattern of a non-nucleated PP filament tinder a low draw environment. The fiber axis is approximately horizontal. One observes large scattering spots arising from the lamellar stacking of PP crystals in the fiber. The position of these spots arises from the long period spacing such that an increasing long period spacing will cause the spots to move inward toward the center and conversely a smaller long period spacing will cause the spots to move out. Furthermore, the breadth of the peaks along the normal axis of the fiber is an indication of the breadth of the crystallites such that narrow peaks are indicative of large crystallites and broader peaks are indicative of small crystallites. The final feature of note is the equatorial scattering arising from the center normal to the fiber axis and projecting in a long, thin streak away from the center in each direction. This equatorial scattering arises from fibrillation of the crystalline segments into more clearly defined needle-like assemblies. A long equatorial streak arises from a high concentration of cylindrical, shish-type structures in the fiber with the lamellae organized among or around the shishes. These streaks generally appear in higher draw situations as described below. As the non-nucleated fiber is drawn farther and ultimately to its maximum, the SAXS pattern comes to resemble FIG. 4. This pattern is characterized by several features, the first of which is an overall decrease in the scattering power of the structures as the density of the system becomes more constant. The equatorial streak intensifies and hence the ratio of equatorial scattering to meridonal scattering will decrease. Furthermore, the meridonal scattering will decrease in intensity and broaden laterally and the peak will move inwards indicating an increase in long period but decrease in the lateral size of the crystallites. However, this structure is not favored because it is characterized by poor physical properties. FIG. 5 is indicative of an inventive fiber at low draw conditions wherein the meridonal reflection is strong and the equatorial scattering is strong such that the scattering ratio is lower than that in FIG. 3 and total scattering is high, but there remains strong density contrast as indicated by the overall intensity. This filament is balanced in properties structurally and continues in balance to higher draw conditions up to its maximum as illustrated in FIG. 6. Even at an elevated draw ratio over that obtained by non-nucleated fibers, the balance of scattering indicates good density contrast as well as maintenance of the meridonal spacing while maximizing equatorial scattering. Furthermore, the meridonal reflection is not broadened as in FIG. 4, thus the lateral size of the crystallites remain relatively large. When the nucleated sample becomes overdrawn, scattering such as that in FIG. 7 appears and the materials is no longer optimized being similar in appearance to FIG. 4.

The inventive material gives to rise to a SAXS scattering profile that maximizes both meridonal scattering and equatorial scattering while maintaining strong overall scattering and maximizing the long period spacing. At the very least, then, the presence of recognizable scattering at both equatorial and meridonal directions provides the desired crystal structures that impart the properties of creep-strain, high tensile strength, low-shrink, and the like, as highly desired for such inventive fibers and/or yarns. Measurements for certain samples are provided in tabular form below to show the relative intensities between the sample fibers, as well as the ratios between equatorial and meridonal intensities for each. Coupled with the creep-strain analyses above, it is evident that such measurements provide excellent, surprisingly effective polypropylene monofilament and/or tape fibers for high tenacity, low-creep applications.

EXPERIMENTAL TABLE #8
Monofilament Fiber XRD Characteristics

| Sample | Long Period (nm) | Int (Eq) (counts) | Int (Me) (counts) | Int (total) (counts) | Ratio (Me/Eq) |
|---|---|---|---|---|---|
| 3 | 22.5 | 18358 | 150191 | 168549 | 8.18 |
| 8 | nm | 21465 | 71909 | 93464 | 3.35 |
| 9 | 27.6 | 24769 | 127998 | 152767 | 5.17 |
| 12 | 26.0 | 29327 | 98132 | 127459 | 3.35 |
| 16 | 22.0 | 17209 | 102331 | 119540 | 5.95 |
| 17 | 24.5 | 20681 | 143082 | 163763 | 6.92 |
| 23 | nm | 22083 | 58484 | 80567 | 2.65 | nm = not measurable (too large for the instrument to read)

EXPERIMENTAL TABLE #9
Monofilament Fiber XRD Characteristics

| Sample | Long Period (nm) | Int (Eq) (counts) | Int (Me) (counts) | Int (Total) (counts) | Ratio (Me/Eq) |
|---|---|---|---|---|---|
| a | 29.1 | 79703 | 90971 | 170674 | 1.14 |
| b | 27.1 | 48210 | 62908 | 111118 | 1.30 |

-continued

EXPERIMENTAL TABLE #9
Monofilament Fiber XRD Characteristics

| Sample | Long Period (nm) | Int (Eq) (counts) | Int (Me) (counts) | Int (Total) (counts) | Ratio (Me/Eq) |
|---|---|---|---|---|---|
| c | 23.9 | 17753 | 70458 | 88211 | 3.97 |
| d | 24.5 | 18012 | 70682 | 88694 | 3.92 |
| e | nm | 38668 | 69475 | 108143 | 1.80 |
| f | 21.0 | 35849 | 89034 | 124883 | 2.48 |
| g | 29.4 | 12841 | 85912 | 98753 | 6.69 |
| h | 22.0 | 16332 | 59869 | 76201 | 3.67 |
| i | 23.2 | 11423 | 49016 | 60439 | 4.29 |
| j | nm | 19120 | 45436 | 64556 | 2.38 |
| k | 22.0 | 24332 | 75609 | 99941 | 3.11 |
| l | nm | 11347 | 43937 | 55284 | 3.87 |
| m | 23.2 | 33928 | 64736 | 98664 | 1.91 |

Thus, a fiber or yarn that is nucleated and exhibits an meridonal over equatorial intensity ratio of at most 5 provides the desired difficult-to-deform, low creep materials within this invention.

There are, of curse, many alternative embodiments and modifications of the present invention which are intended to be included within the spirit and scope of the following claims.

What we claim is:

1. A monofilament polypropylene fiber that exhibits a time to reach 10% elongation under the creep-strain test of at least 4 hours.

2. The monofilament fiber of claim 1 wherein said monofilament fiber contains at least one non-coloring nucleating agent.

3. The monofilament fiber of claim 2 where said nucleating agent is selected from the group consisting of 1,3:2,4-bis(p-methylbenzylidene) sorbitol, 1,3:2,4-bis(3,4-dimethylbenzylidene) sorbitol, disodium [2.2.1]heptane bicyclodicarboxylate, sodium 2,2'-methylenebis-(4,6-di-tert-butylphenyl)phosphate, and any mixtures or combinations thereof.

4. The monofilament fiber of claim 3 wherein said nucleating agent is selected from the group consisting of 1,3:2,4-bis(p-methylbenzylidene) sorbitol, 1,3:2,4-bis(3,4-dimethylbenzylidene) sorbitol, and any mixtures thereof.

5. The monofilament fiber of claim 2 where said nucleating agent comprises sodium benzoate.

6. The monofilament fiber of claim 2 where said monofilament comprises a flat tape.

7. The monofilament fiber of claim 1 where monofilament exhibits recognizable scattering intensities in both the equatorial and meridonal axes when analyzed by small angle X-ray scattering such that the ratio of meridonal over equatorial axis intensities is at most about 5.

8. The monofilament fiber of claim 7 wherein said monofilament contains at least one non-coloring nucleating agent.

9. The monofilament fiber of claim 8 where said nucleating agent is selected from the selected from the group consisting of 1,3:2,4-bis(p-methylbenzylidene) sorbitol, 1,3:2,4-bis(3,4-dimethylbenzylidene) sorbitol, disodium [2.2.1]heptane bicyclodicarboxylate, sodium 2,2'-methylene-bis-(4,6-di-tert-butylphenyl)phosphate, and any mixtures or combinations thereof.

10. The monofilament fiber of claim 9 wherein said nucleating agent is selected from the group consisting of 1,3:2,4-bis(p-methylbenzylidene) sorbitol, 1,3:2,4-bis(3,4-dimethylbenzylidene) sorbitol, and any mixtures thereof.

11. The monofilament fiber of claim 8 where said nucleating agent comprises sodium benzoate.

12. The monofilament fiber of claim 7 where said monofilament is a flat tape.

13. The monofilament fiber of claim 1 where said monofilament has a 3% secant modulus of greater than 100 grams/denier.

14. The monofilament fiber of claim 13 wherein said monofilament fiber contains at least one non-coloring nucleating agent.

15. The monofilament fiber of claim 14 where said nucleating agent is selected from the selected from the group consisting of 1,3:2,4-bis(p-methylbenzylidene) sorbitol, 1,3:2,4-bis(3,4-dimethylbenzylidene) sorbitol, disodium [2.2.1]heptane bicyclodicarboxylate, sodium 2,2'-methylene-bis-(4,6-di-tert-butylphenyl)phosphate, and any mixtures or combinations thereof.

16. The monofilament fiber of claim 15 wherein said nucleating agent is selected from the group consisting of 1,3:2,4-bis(p-methylbenzylidene) sorbitol, 1,3:2,4-bis(3,4-dimethylbenzylidene) sorbitol, and any mixtures thereof.

17. The monofilament fiber of claim 14 where said nucleating agent is sodium benzoate.

18. The monofilament fiber of claim 14 where said monofilament is a flat tape.

19. The monofilament fiber of claim 14 where monofilament exhibits recognizable scattering intensifies in both the equatorial and meridonal axes when analyzed by small angle X-ray scattering such that the ratio of meridonal over equatorial axis intensities is at most 5.

* * * * *